United States Patent [19]

Herscovici

[11] Patent Number: 5,073,157
[45] Date of Patent: Dec. 17, 1991

[54] MECHANICALLY VARIABLE TRANSMISSION

[75] Inventor: Saul Herscovici, Waterloo, Iowa

[73] Assignee: Power Engineering & Manufacturing, Ltd., Waterloo, Iowa

[21] Appl. No.: 482,074

[22] Filed: Feb. 20, 1990

[51] Int. Cl.$^5$ ............................................. F16H 37/00
[52] U.S. Cl. .................................... 475/211; 475/214; 474/237
[58] Field of Search ............... 475/210, 211, 212, 213, 475/214, 215; 474/237, 239, 15

[56] References Cited

U.S. PATENT DOCUMENTS

| | | | |
|---|---|---|---|
| 1,242,618 | 10/1917 | Stevens | 475/215 |
| 2,330,397 | 9/1943 | Trofimov | 475/211 |
| 2,467,226 | 4/1949 | Place | 74/681 |
| 2,760,386 | 8/1956 | Southwick | 475/211 |
| 2,889,716 | 12/1957 | Doty | 475/211 |
| 3,091,132 | 5/1963 | Mayfield et al. | 475/211 |
| 3,405,571 | 10/1968 | Mersch | 475/211 |
| 3,511,349 | 8/1968 | Herscovici | 192/56 R |
| 4,406,178 | 9/1983 | Gillade | 475/211 |
| 4,546,673 | 10/1985 | Shigematsu et al. | 74/866 |
| 4,553,450 | 11/1985 | Gizard | 475/212 |
| 4,644,820 | 2/1987 | Macey et al. | 475/211 |
| 4,718,012 | 1/1988 | Oshiage | 364/424.1 |

FOREIGN PATENT DOCUMENTS

| | | | |
|---|---|---|---|
| 185184 | 7/1955 | Austria . | |
| 611975 | 3/1935 | Fed. Rep. of Germany | 474/249 |
| 1147208 | 11/1957 | France | 474/15 |
| 1148087 | 12/1957 | France | 474/15 |
| 473170 | 1/1954 | Italy | 475/211 |
| 65963 | 4/1986 | Japan | 475/210 |
| 300476 | 11/1928 | United Kingdom | 474/249 |
| 2093133 | 8/1982 | United Kingdom | 475/210 |
| 2115091 | 9/1983 | United Kingdom . | |

Primary Examiner—Allan D. Herrmann
Assistant Examiner—Ryan W. Massey
Attorney, Agent, or Firm—Breneman & Georges

[57] ABSTRACT

A mechanically variable transmission is provided by a novel arrangement of sheaves in combination with a power ring which can be utilized with a planetary device to smoothly varying output speed from maximum rotational speed in one direction to maximum speed in the opposite direction while passing through or maintaining zero output speed or any other speed in a forward or reverse direction while the input speed is varied or remains constant. The novel arrangement provides changes in the output speed over the entire range of engine power and under all load conditions since declutching is not necessary to shift gears allowing the engine to operate at a constant horsepower over the entire range of throttle settings and can enhance engine efficiency by allowing the engine to operate at the lowest possible speed and highest torque. The infinitely variable speed transmission and engine can be controlled with a computer control to maintain the engine at full torque but the lowest possible speed while varying the infinitely variable transmission ratio to maintain a constant or desired ground speed.

55 Claims, 14 Drawing Sheets

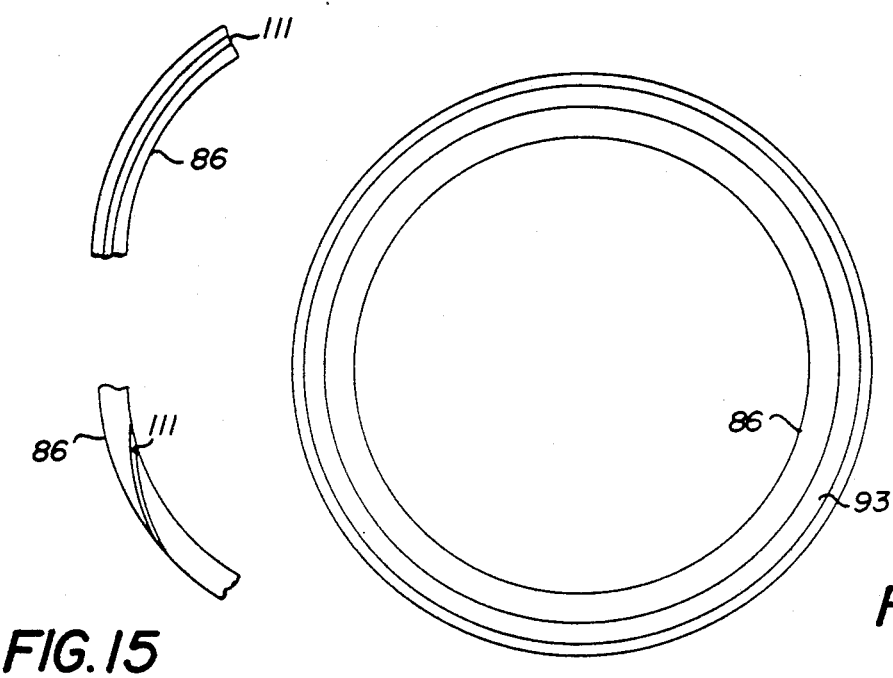
FIG. 14
FIG. 16
FIG. 15
FIG. 11
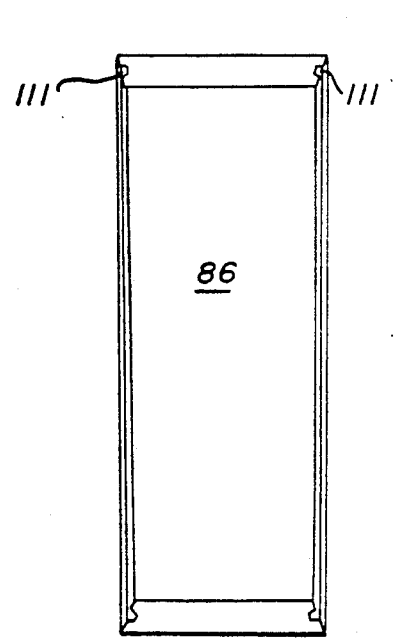
FIG. 13
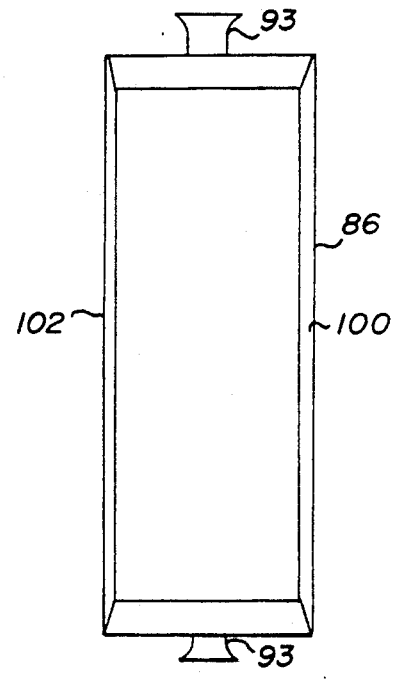
FIG. 12

MECHANICALLY VARIABLE TRANSMISSION

BACKGROUND OF THE INVENTION

1. Field Of The Invention

The present invention pertains to a mechanically variable transmission for utilizing a constant or variable speed input and constant or variable torque input and varying the output speed and output torque. More particularly the invention pertains to a novel arrangement of sheaves and power ring in combination with a planetary to provide an infinitely variable mechanical transmission having an input sheave and an output sheave operatively connected to an output shaft and circular power ring including a means for radially positioning the power ring with respect to the input and output sheaves. The input sheave and output sheaves are axially adjustable and have an included angle of from about 0.5° to 45° and are connected to one another by the power ring having a generally frustro conical cross section with substantially flat side faces that is radially positionable with respect to the input and output sheaves for varying and transmitting power to the output shaft.

The balance between the power from the input sheave and output sheave provided by the radially adjustable power ring to a planetary device allows novel transmissions constructed in accordance with invention to utilize a constant or variable input speed and constant or variable input torque and provide a constant or variable output speed and a constant or variable output torque to optimize fuel efficiency, engine life and reduce pollution by allowing the engine to operate at full torque and at the minimum speed necessary to obtain the most fuel efficient mode of operation. The novel mechanically variable transmission is susceptible to computer control which can be utilized for novel transmissions constructed in accordance with the invention or that can be coupled to both the novel transmissions and engine for operating the engine at full torque with the lowest possible speed while varying the position of the power ring in relation to the sheaves to maintain a constant or desired ground speed by changing the operating ratio continuously in the novel transmission to maintain the desired speed. Transmissions constructed in accordance with the invention increase engine life and reduces fuel consumption and pollution by providing power efficiency advantages over traditional transmissions by changing speeds under load without the interruption of the power transfer required in shifting gears in response to load, speed and road conditions and the resulting raising and lowering engine RPM changes that result in the exhaust of incompletely burned fuels and gases that pollute the atmosphere when an engine is not continuously run at maximum torque at the lowest possible speed.

2. Description Of The Prior Art

In recent years extensive research has been devoted to improving engine efficiency, increasing gas mileage and reducing pollution. Very little progress has been made in improving the interface between the engine and the vehicle transmission to provide the most fuel efficient, most engine efficient and least engine polluting operation of the engine by focusing upon the engine and transmission interface to provide the most efficient transmission of engine power and torque to the operation of the vehicle. The most efficient operation of an internal combustion engine for vehicles is the operation of the engine at full torque and at the lowest possible speed necessary to maintain or attain a desired ground speed.

In prior art transmissions efficient engine operation is not possible most of the time since the gears define the operating limitations of torque and speed which require extensive shifting of gears in response to load and terrain conditions encountered in the operation of the vehicle. Vehicle speed is determined by engine RPM and gear ratio so that once the gear is selected speed is determined by engine RPM. The prior art transmissions and engine combination maximum efficiency at full load and maximum terrain since the engine is then operating at the maximum torque and the minimum speed necessary for operation at a given speed. The novel transmissions of the present invention are designed to achieve these same maximum efficiency condition at all other load and terrain condition by utilizing the novel power ring and sheaves of the invention.

Generally one third of the fuel energy is expelled as wasted combusted heat and exhaust gases, one third is friction heat, together some of the friction heat being expelled through the radiator, and the other third is useful work in the operation of the vehicle. Unfortunately the one third that is useful work is only efficiently utilized when the engine is operated a full load at which time the least amount of pollutants are discharged in the atmosphere and the greatest amount of engine efficiency is utilized.

Prior art engines and transmission combinations cannot operate at full torque at all times since current transmissions that use gears with fixed ratios require engine RPM to be constant in order to maintain a constant traveling speed. Therefore engine efficiency would be optimized by transmission system that eliminates fixed gears and allows the engine to operate at full torque but at the lowest possible speed to obtain a desired road speed and thereby reduce fuel consumption, pollution and increase the efficient operation of the engine and thereby reduce the high engine wear normally encountered in vehicles. These advantages can be obtained by the elimination of the transmissions generally utilized in vehicles and the replacement of those transmissions with a transmission device which allows the engine to be operated at maximum torque irrespective of the road conditions but at lowest possible speed and instead of varying engine speed vary the transmission ratio in order to obtain and maintain a particular desired speed.

The prior art has recognized the advantages of utilizing an infinitely variable bidirectional power transmission such as illustrated in U.S. Pat. Nos. 4,406,178; 4,644,820; 4,546,673; 2,889,716; 4,553,450 and U.K. 2,115,091 employ variable speed pulleys that are connected by either belts or chains in combination with various forms of planetary gears to provide a variable drive. The problems with such prior art devices is the load forces coupled with friction cause the belts to wear and break and the chains to lag and lead around the pulleys or gears. These forces coupled with the elastic nature of chains and belts do not provide a positive drive. Such prior art does not teach or suggest the utilization of a combination of a solid power ring having load bearing side faces with adjustable sheaves to provide an efficient transmission and division of power.

In addition such prior art does not utilize a computer for interfacing the transmission with the power source to provide for the maximum torque output for the internal combustion engine while maintaining the minimum speed while varying the transmission of power between the input and output sheaves to obtain maximum engine and fuel efficiency. The inapplicability of computer control of such prior art devices may also be the result of the elasticity of belts and chains under varying load conditions which make the application of computer control to such prior art inefficient and difficult for failing to provide a reliable and consistent power transfer.

Other prior art such as U.S. Pat. Nos. 4,718,012 and 4,546,673 pertain to variable speed transmission which include various computer controlled and assisted arrangements for optimizing power output and coordinating the variable transmission with variable engine speed. These prior art systems utilize computer control of belts (4,546,673) and hydraulic systems (4,718,012) which are difficult and complicated to control as a consequence of the elasticity of the belts and compressibility of the fluids. These prior art systems do not teach or suggest a system of positive control employing a substantially inelastic metal power ring in combination with adjustable sheaves for providing substantially instantaneous and positive power that can be effectively controlled by a computer. The prior art systems are inefficient and expensive as a consequence of their design of employing belts, chains and hydraulic flow lines in combination with a computer present serious limitations as a result of the inherent fluid compressibility and flow characteristics of fluids. Such systems result in the inefficient use of computers and instantaneous computer generated change as a result of the lag for the hydraulics and belts and chains.

The only prior art known to employ an apparently solid power ring is German Patent No. 185,184 which schematically illustrates a variable speed transmission having an input sheave and an output sheave connected by circular metal power ring with a round cross section that is apparently is utilized in a soap press for making allowances for the varying consistencies of processed soap. This device does not pertain to automobiles or vehicle transmissions and is a speed as opposed to a power transmission device as it does not employ a power ring of a configuration necessary to transfer power between adjustable sheaves. German patent No. 185,184 does not teach or suggest the Applicant's transmission nor does it teach or suggest the utilization of a computer for varying the torque and speed of the transmission while maintaining full torque and optimum speed for the internal combustion engine or the interface between an automobile engine and the transmission.

The inefficiencies of the prior art system are eliminated in accordance with the invention by providing a positive geared relationship between the input and output shaft and the input and output sheaves with a power ring to provide a responsive transmission suitable for providing a mechanically infinitely variable speed that can be controlled with a computer. The novel combination of adjustable sheaves and power ring provides a mechanically infinitely variable transmission that is adaptable to computer control for the output of an internal combustion engine to maximize fuel efficiency, minimize pollution and wear on the internal combustion engine. The geared relationship between the sheaves and the output shaft and the engine allows the engine to be operated at full torque while operating at a speed which provides the most fuel efficient mode of operation in relation to the road conditions and load conditions of the vehicle.

The positive geared relationship between the elements of the novel infinitely variable transmission allows the transmission to vary output speed smoothly from maximum rotational speed in one direction to maximum rotational speed in the opposite direction while passing through or maintaining zero output speed, or any other speed, in a forward or reverse direction while the output speed remains constant or also varies. The change in output speed over the entire range can be made continuously under full load as no declutching is necessary to shift the gears and, in addition, eliminates belts, fluids and other elastic devices that prevent a positive control of the transmission. The present metal power ring in combination with the adjustable sheaves and a planetary device provides an inexpensive, efficient and direct gearing system which allows the entire device to be controlled by a computer to provide fuel efficiency, increased engine life and decreased pollution.

SUMMARY OF THE INVENTION

The present invention provides a mechanically variable transmission which includes two adjustable sheaves having moveable hubs disposed in opposite axial directions in relation to one another in which at least one of the adjustable sheaves is operatively connected to an output shaft in combination with a substantially circular power ring composed of metal or other inelastic material together with a means for radially positioning the power ring with respect to the adjustable sheaves. In this application of the invention a planetary device may not be utilized but the novel transmission is not infinitely variable and does not provide a reverse by the diversion of power between the two sheaves.

The invention may be conveniently employed in mechanically infinitely variable transmissions that are bidirectional by operatively connecting the two adjustable sheaves to a planetary device in a number of mechanical arrangements. The novel infinitely variable transmission may be connected to an internal combustion engine or other input power motor through an input clutch or other device for intermittently connecting the transmission to the power source. The adjustable input sheave receives the power directly from the engine or through the clutch and transmits it through a shaft into the planetary gears. The input sheave also transmits some of the power received from the input power motor to the second adjustable sheave through a substantially circular power ring having substantially flat side faces of a generally frustro conical configuration. The output sheave receives power from the power ring and transmits it to the planetary device operatively connected to the output shaft. The speed of the output sheave connected to the input sheave through a power ring is determined by the radial position of the power ring in the sheaves which provides a variation of the speed and power transfer from the input sheaves to the output sheaves.

The adjustable sheaves transfer power to the power ring through the sheave side faces that have an included angle of from about 0.5° to 45°. The substantially circular power ring has a frustro conical cross section corresponding to the included angle of the sheaves to provide a substantially flat contact with the sides of the sheaves. The relative power provided by the input sheave and output sheave depends upon the relative radial position of the power ring as the power ring moves radially on the sheave side faces. The speed of the output sheave is inversely proportional to the ratio of the output sheave radius when divided to the input sheaves radius of the sheave to the ring contact point.

The planetary device is composed of three major components; the sun pinion, ring gear, and planetary carrier which includes the planet gears. In the preferred embodiment of the invention the planetary carrier is operatively connected to the output shaft and the sun gear is operatively connected to the input sheave which operates at the same speed as the input sheave. The ring gear is also an input component but it operates at a variable speed as determined by the output sheave which is dependent upon the position of the power ring relative to the adjustable input and output sheaves.

The power for operating the novel transmission may come from an internal combustion engine or other power source which transmits the power to the input shaft which flows to the input sheave shaft. The power from the internal combustion engine is transferred from the input sheave in the preferred embodiment directly to a sun gear operatively connected to the output shaft connected to the planetary carrier. The input sheave is connected to the output sheave by a power ring to provide a variable power transfer between the input sheave and the output sheave. The output sheave is connected to a gear which drives a ring gear which is operatively connected to the output shaft.

The division of torque and power between the input sheave and output sheave is controlled by the position of the power ring in the race of the input sheave and the output sheave. The power division between the direct power of the input sheave to the sun gear and output shaft and the output sheave to the power ring and planetary carrier to the output shaft may be controlled by a computer or set manually at various power levels to optimize efficiency at various engine RPM and power settings. The mechanically infinitely variable transmission may be computer controlled by controlling the transmission, the engine or both to operate the engine at maximum torque and minimum speed to obtain any given speed configuration depending upon load and road conditions encountered.

These and other features of the invention reduce fuel consumption, reduce engine wear and reduce pollution by eliminating the necessity of declutching the engine and drastically increasing and reducing the speed of the engine in response to changing the gears and maintaining maximum torque at which the engine operates. Moreover as a consequence of the design of the novel variable transmission the invention may be conveniently configured in a variety of ways to suit particular requirements for reducing pollution, fuel consumption and increasing engine life.

DESCRIPTION OF THE DRAWINGS

Other advantages of the invention will become apparent to those skilled in the art from the following detailed description of the invention in conjunction with the accompanying drawings in which:

FIG. 11 is a side elevational view of a power ring for connecting the input sheave and output sheave;

FIG. 12 is a cross section view of a portion of the power ring of FIG. 11;

FIG. 13 is a cross section view of a portion of an alternative embodiment of a power ring having substantially flat side faces including grooves;

FIG. 14 is a side elevational view of a portion of the power ring of FIG. 13;

FIG. 15 is a side elevational view of a portion of an alternative embodiment of a power ring having substantially flat side faces having a non concentric groove pattern;

FIG. 16 is a side elevational view of a portion of an alternative embodiment of a power ring having substantially flat side faces and a radial groove pattern;

DETAILED DESCRIPTION OF THE INVENTION

Figure 1:
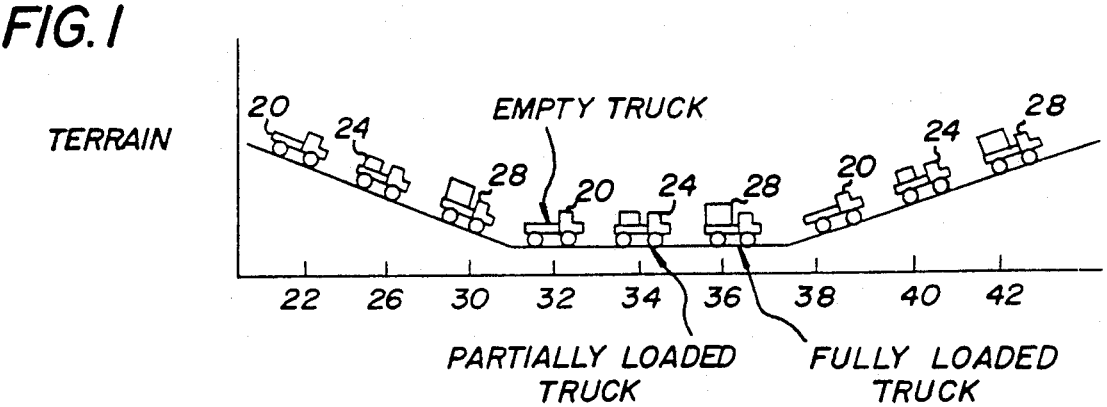
FIG. 1 is a graph illustrating a vehicle in three different load and terrain conditions in which a comparison is made in FIGS. 2, 3, 4 and 5 with ground speed, engine speed, fuel efficiency and energy conversion efficiency between transmissions constructed in accordance with the invention and the prior art.
Figure 2:
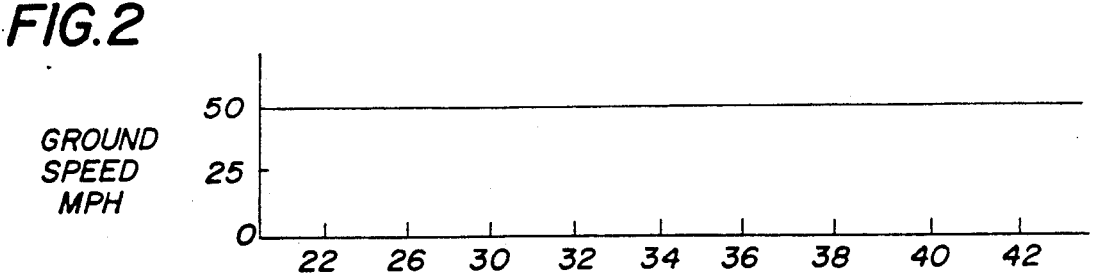
FIG. 2 is a graph illustrating ground speed in relation to the vehicles of FIG. 1 encountering various terrain and load conditions at a given ground speed with a transmission constructed in accordance with the invention and prior art.
Figure 3:
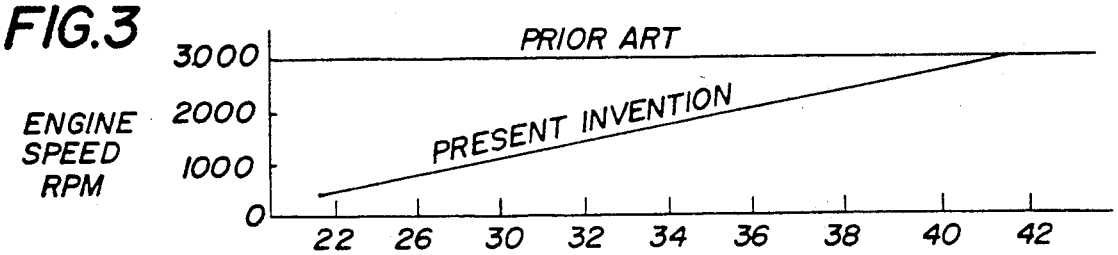
FIG. 3 is a graph illustrating a comparison of engine speed RPM in relation to a particular ground speed, load and terrain condition utilizing transmissions constructed in accordance with the invention and the prior art.

Referring now to FIGS. 1-5 a comparison of fuel efficiency and energy conversion efficiency can be made for fully loaded, partially loaded and empty vehicles travelling at various terrain configurations employing prior art transmissions and the novel transmissions of the invention. In FIG. 1 empty vehicle 20 at line 22 represents an empty vehicle on a downwardly sloping terrain in which line 22 in connecting FIGS. 1-5 compares a given ground speed of 50 miles an hour with a prior art transmission and engine operating at 3000 RPM with the novel transmission in which the engine operates at around 500 RPM to maintain the same 50 mile an hour ground speed. The ground speed of empty vehicle 20 is maintained by varying the relationship of the power ring in the sheaves to operate the engine at maximum engine torque at the minimum speed required to maintain the 50 miles an hour ground speed.

Figure 4:
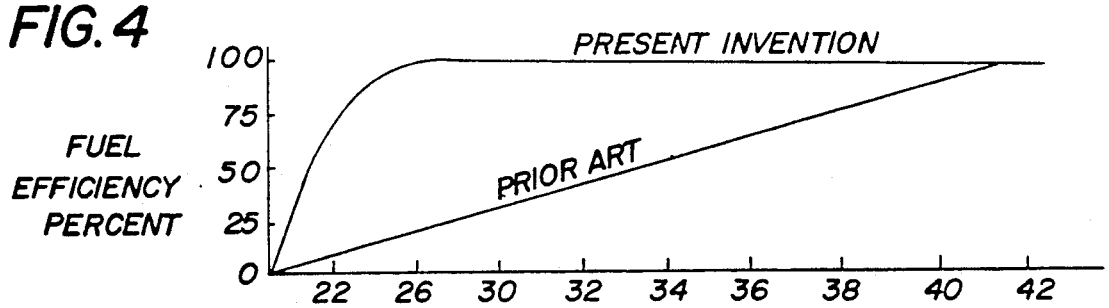
FIG. 4 is a fuel efficiency graph illustrating a comparison of fuel efficiency in relation to a particular ground speed, load and terrain conditions utilizing transmissions constructed in accordance with the present invention and the prior art.
Figure 5:
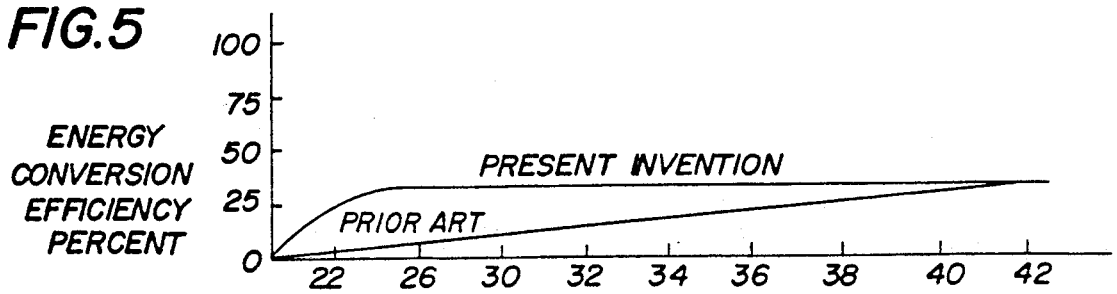
FIG. 5 is an energy conversion graph illustrating a comparison of the percent of energy conversion efficiency in relation to a particular ground speed, load and terrain conditions utilizing transmissions constructed in accordance with the present invention and the prior art.

FIG. 4 demonstrates that empty vehicle 20 on the downwardly sloping terrain as represented by line 22 obtains close to 75% fuel efficiency whereas an empty vehicle 20 equipped with the prior art transmission has a fuel efficiency of about 10%. FIG. 5 demonstrates that empty vehicle 20 as represented by line 22 has an energy conversion efficiency percentage of less than 5% whereas the energy conversion efficiency of an empty vehicle 20 equipped with the novel transmission of the present invention has an energy conversion efficiency approaching 25%.

Similarly a comparison of FIGS. 1-5 show that a partially loaded vehicle 24 equipped with a novel transmission on the same downwardly sloping terrain represented by line 26 at the same 50 mile an hour ground speed has an engine RPM of about 500 a fuel efficiency of about 90% and an energy conversion efficiency better than 25% while the prior art engine and transmission combination for the same partially loaded vehicle 24 at the same 50 miles an hour ground speed has an engine speed of 3000 RPM with about a 15≧20% fuel efficiency and an energy conversion efficiency of about 5%. A fully loaded truck 28 with the novel transmission on the same downwardly sloping terrain as represented by line 30 would have an engine speed of about 800 RPM to maintain a ground speed of 50 miles an hour whereas a vehicle with a prior art transmission still requires a 3000 RPM engine speed to maintain the 50 miles an hour ground speed. Under these conditions the present invention has a fuel efficiency percentage of about 90% and a energy conversion efficiency approaching 30% compared to the prior art fuel efficiency of about 25% and the energy conversion efficiency percentage of about 10%.

Similarly a comparison of the prior art transmission and the novel transmission in an empty vehicle 20 on flat terrain at a ground speed of 50 miles an hour is represented by line 32 and the partially loaded vehicle 24 on flat terrain is represented line 34 and the fully loaded vehicle 28 is represented by line 36. As indicated by FIGS. 1-5 to maintain the same ground speed of 50 miles an hour the prior art transmission must in all cases maintain a 3000 engine RPM either on the downwardly sloping, level road or upwardly sloping road thereby sacrificing fuel efficiency and energy conversion whereas the novel transmission of the invention increases fuel efficiency by changing engine RPM while maintaining maximum torque of the engine to reduce pollution and increase gas mileage. As can be seen by lines 38, 40 and 42 in FIGS. 1-5 the only time a vehicle approaches the efficiency of the novel transmission at a given ground speed is when the vehicle is fully loaded and the engine torque is maintained at maximum to maintain a given speed. These conditions are of limited duration in the operation of prior art transmissions since vehicles are not always fully loaded and are not always climbing uphill at maximum engine torque. As a result the efficiency of the novel transmissions of the invention provides increases in energy conversion and fuel efficiency over the prior art in all the conditions represented by lines 40, 38, 36, 34, 32, 30, 26 and 22.

The novel transmissions of the invention exhibits additional advantages in providing a smooth transition from one load and terrain condition to another load and terrain condition thereby maximizing the efficiency of the engine and reducing pollution by eliminating the rapid changes in speeds incurred in shifting gears as required in prior art transmissions. The novel transmissions of the invention allows the engine to work at its highest efficiency at any given speed by operating the engine at full torque and reducing the engine RPM to the lowest engine RPM necessary to maintain a given speed at a given load and road configuration.

The efficiency of the novel transmissions of the invention can further be increased by the utilization of a computer to control the position of the power ring to smoothly transition between terrain conditions or the computer can be coupled to both the novel transmission and the engine to control both the engine torque and engine RPM and the variable speed transmission to optimize the torque or horsepower required under all driving conditions and load configurations to optimize fuel efficiency and reduce fuel consumption and pollution. These advantages cannot be achieved in prior art transmissions since prior art transmissions require the engine RPM to be maintained at a given RPM irrespective of load and terrain conditions to maintain a particular speed since torque or horsepower is disregarded until such point as full load and full uphill terrain conditions are encountered.

In contrast transmissions of the invention are capable of maintaining torque at a maximum to obtain maximum fuel efficiency and adjust engine speed to maintain a desired ground speed by repositioning the power ring to obtain and maintain the greatest engine efficiency. A computer when utilized in conjunction with the novel transmission and internal combustion engine interface provides direct and positive control of both the engine and transmission to allow the operation of the internal combustion engine at maximum torque and at the lowest possible speed while varying the transmission ratio to maintain a constant or desired ground speed. As a result the engine will be operated at minimum RPM to provide the needed horsepower or speed to maintain a given speed setting while the transmission is constantly changing the position of the power ring to maintain the desired travelling speed.

Optional clutches may be provided to further improve the efficiency of novel transmissions constructed in accordance with the invention to extend the speed ranges. Utilization of clutches with appropriate gears could be employed to improve the reverse efficiency and allow the engine to be utilized at maximum efficiency in forward or reverse configurations for vehicles that need to work in both directions at a particular speed. In addition the novel transmissions equipped with a clutch would be more efficient in operating the vehicle from a start to stop position rather than dividing the power between the input and output sheaves in start up modes to equalize the division of power between the input and output sheaves and their input to the planetary gear and ring gear to provide a zero output on the output shaft to maintain the vehicle in a stopped position.

The invention may further employ standard prior art clutches or ball and ramp clutches which provide the additional advantage of opening at predetermined overload torque levels to allow the disks and separator plates to slip past each other at a predetermined torque level as described in U.S. Letters Pat. No. 3,511,349. A ball and ramp type torque device (in contrast to a clutch) can be utilized in conjunction with the sheaves to assist in filtering out torque peaks that exceed a predetermined torque level and otherwise could damage the transmission components. The novel transmissions provide benefits to the engine in reducing fuel consumption and to the environment in reducing pollution since fuel is burned at maximum efficiency at all times by the repositioning of the power ring in the novel transmission. The novel transmissions are applicable to all engines and powerplants for vehicles, boats, airplanes, trucks, trenchers, tractors, loaders, and all terrain vehicles. The transmissions of the invention may be advantageously employed in vehicles such as loaders which operate in forward and reverse by allowing such vehicles to smoothly go from maximum forward speed to maximum reverse speed without slipping clutches or shock loading the gears and clutches.

Figure 6:
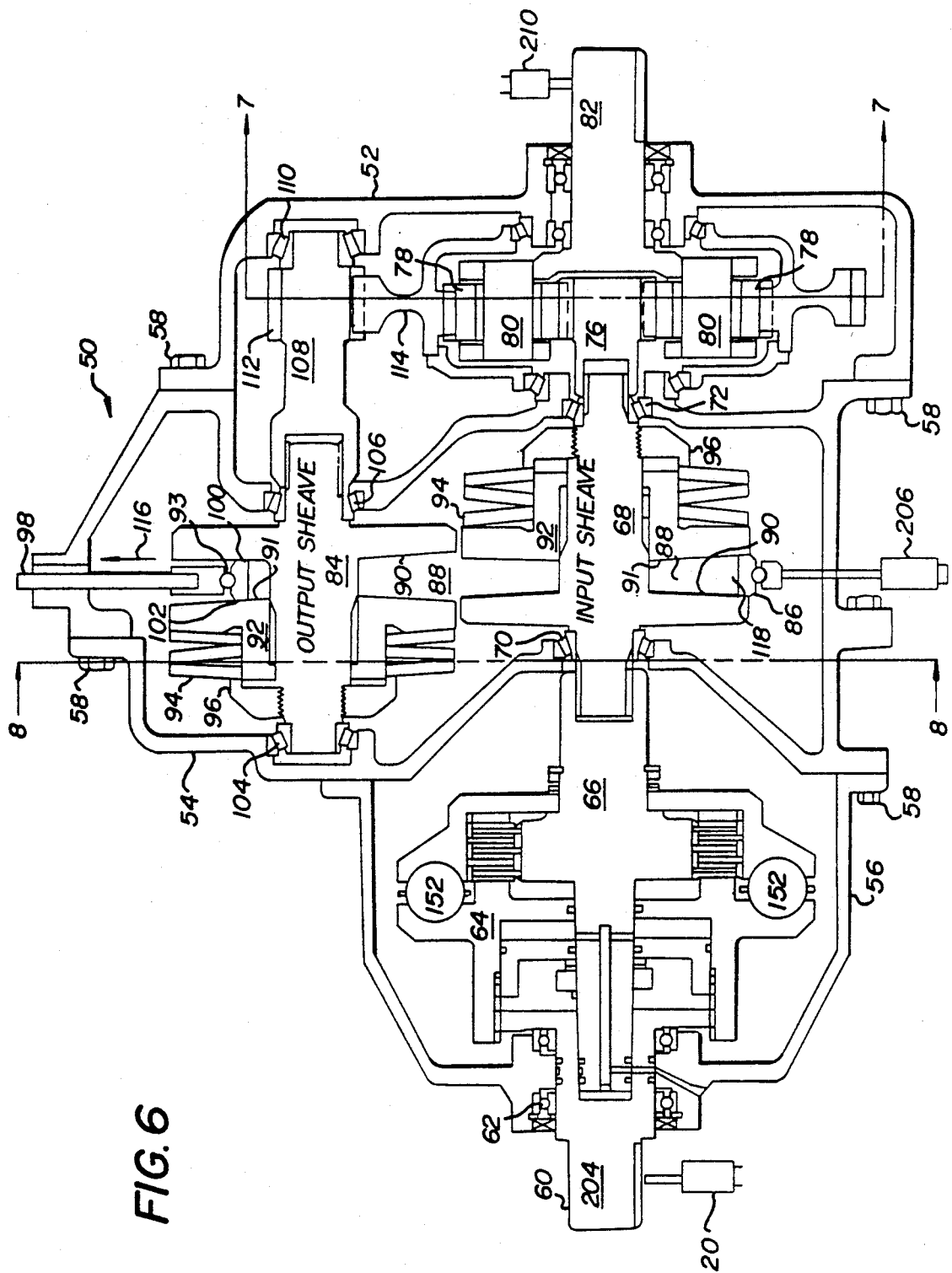
FIG. 6 is a cross-sectional view of a transmission constructed in accordance with the invention.

Referring now to FIG. 6 a transmission constructed in accordance with the invention is illustrated having a housing 50 which housing includes a planetary device housing 52, a sheave housing 54 and an optional clutch housing 56 which is attached to sheave housing 54. The three housing 52, 54 and 56 are connected together with bolts for purposes of convenience but may be constructed as one unitary housing. The three housings 52, 54 and 56 of housing 50 are bolted together by means of bolts 58 to assist in providing convenient access to the planetary housing, sheave housing and clutch housing for purposes of maintenance.

Figure 7:
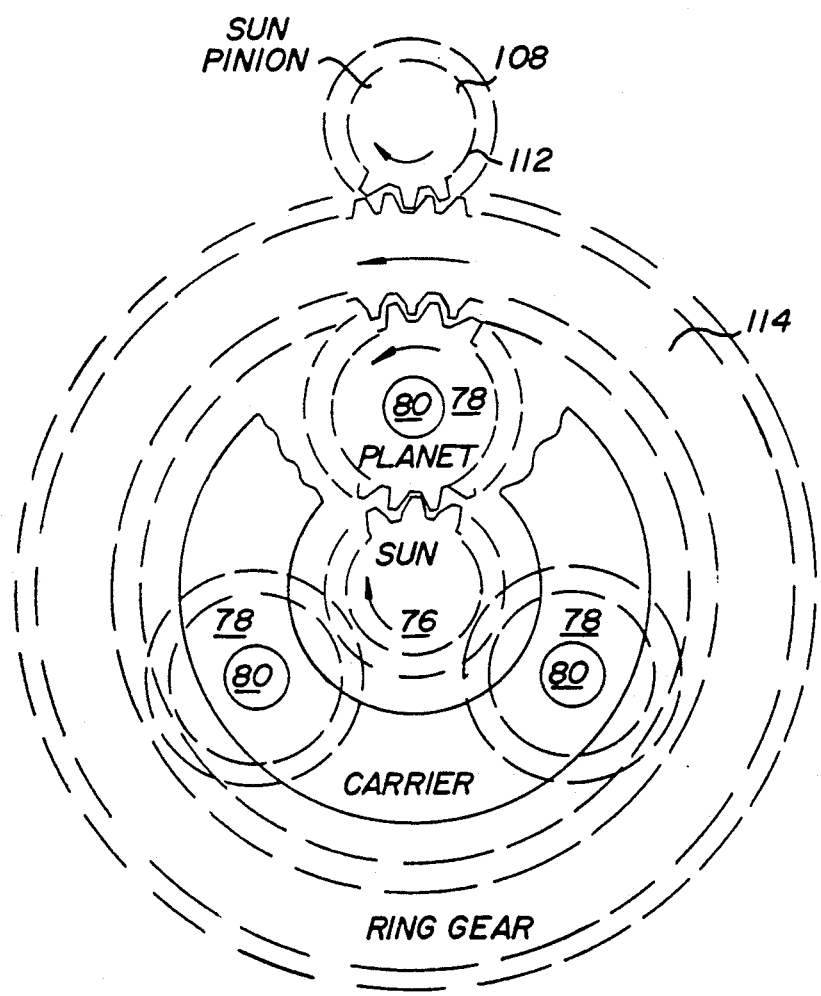
FIG. 7 is a sectional view along the lines 7—7 of FIG. 6.
Figure 8:
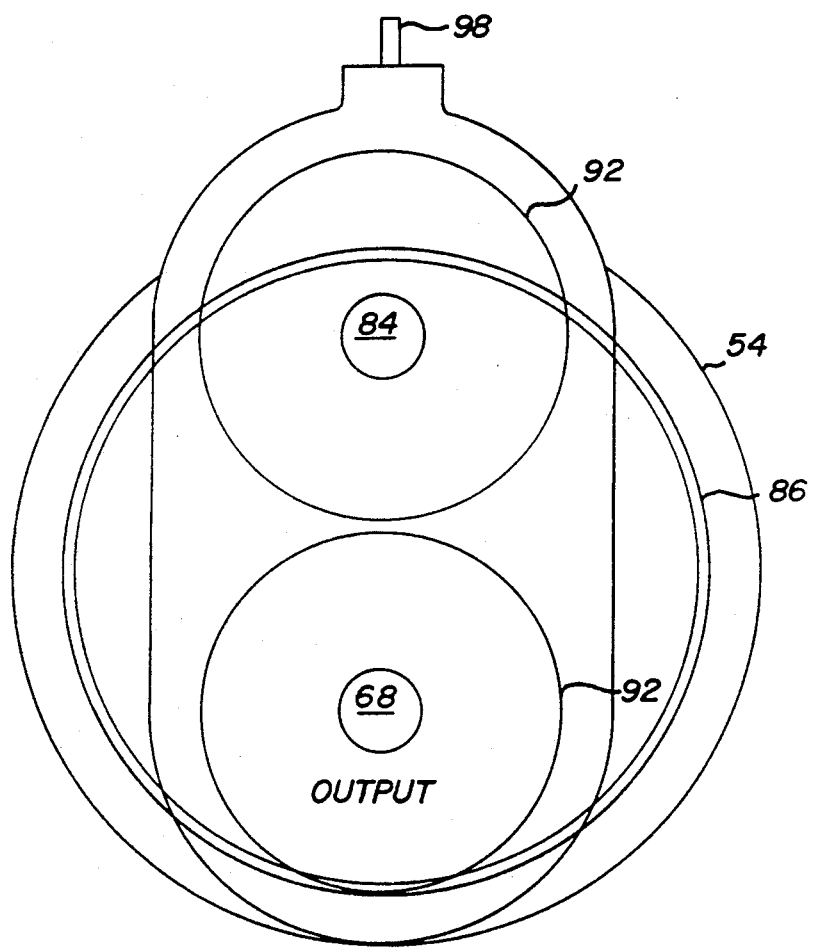
FIG. 8 is a sectional view taken along the lines 8—8 of FIG. 6.

The input shaft 60 may be the input power shaft from an input power motor or internal combustion engine 61 (FIG. 17) that is connected directly to an input sheave or an output sheave or connected through an optional clutch assembly in clutch housing 56. In the preferred embodiment input shaft 60 is from an internal combustion engine which is rotatable mounted to clutch housing 56 through bearings 62. Input shaft 60 may be connected to a standard clutch or a clutch with a ball and ramp overload device similar to that shown in U.S. Pat. No. 3,511,349 which includes a ball and ramp driver member 64 which in the preferred embodiment operates as a clutch in engaging and disengaging the input shaft 60 to the clutch hub 66 for engaging and disengaging the rotational operation of input sheave 68. Input sheave 68 is rotatably mounted in housing 54 with bearings 70 and bearings 72. Input sheave 68 is splined to input sun pinion 76 which is geared to three planetary gears 78 (FIG. 7). The planetary gears 78 are carried on planet shafts 80 which are carried o output shaft 82.

Input sheave 68 is also connected to and drives output sheave 84 through a substantially circular power ring 86 which is carried in a race 88 formed by the fixed wall 90 of input sheave 68 and output sheave 84 in combination with moveable wall 91 of movable hub 92 of input sheave 68 and output sheave 84. Frictional contact along the entire substantially flat side faces of circular power ring 86 is maintained in race 88 by the action of Bellville springs 94 held in place between the movable hub 92 of the input sheave 68 and output sheave 84. The Bellville springs 94 are held in place by restraining nuts 96. The position of the substantially cylindrical power ring 86 in the race 88 is determined by the position of position actuator 98 which is connected to an outer ring and race 93 (FIG. 11) of the substantially cylindrical power ring 86.

The side faces of fixed wall 90 and moveable wall 91 of the input sheave 68 and output sheave 84 are angled and ar designed to match the slightly tapered and subsequently flat sides 100 and 102 of substantially cylindrical power ring 86 included are conforming to fixed wall 90 and movable wall 91 of the input sheave 68 and output sheave 84 to define race 88. Race 88 is defined by the included angle of fixed wall 90 and moveable wall 91 which provide substantially flat side faces having an included angle from about 0.5° to 45°. Preferably the included angle of the substantially flat side faces of the sheaves is from about 3° to 15°. The substantially circular power ring 86 similarly includes tapered sides 100 and 102 to match the included angle of the sheaves to provide a substantially flat matching contact between the sides 100 and 102 of the power ring 86 and the walls 90 and 91 of sheaves 68 and 84. Race 88 is also defined by the relative axial positions of the moveable wall 91 of sheave 68 and sheave 84 which is determined by the position of actuator 98 in combination with the Bellville springs 94 which provide the tension for transferring power from sheaves 68 and 84 through power ring 86. In this manner a complete side wall contact is maintained between the power ring 86 and the walls 90 and 92 of sheaves 68 and 84 which define race 88 for the transmission of power between input sheave 68 and output sheave 84.

Output sheave 84 is rotatable mounted in housing 54 at one end by bearings 104 and at the other end by bearings 106. Output sheave is connected to ring gear drive shaft 108 in planetary housing 52. Ring gear drive shaft 108 is rotatably mounted in housing 52 by bearings 110 and is operatively connected to gear 112 for driving ring gear 114. Ring gear 114 is operatively connected to planetary gears 78 which are operatively connected to output shaft 82 and provide for the division of power flowing from between output sheave 84 in relation to input sheave 68. The division of power between input sheave 68 and output sheave 84 is relative to the position of power ring 86 in race 88 which determines the rotational speed of output shaft 82.

Figure 24:
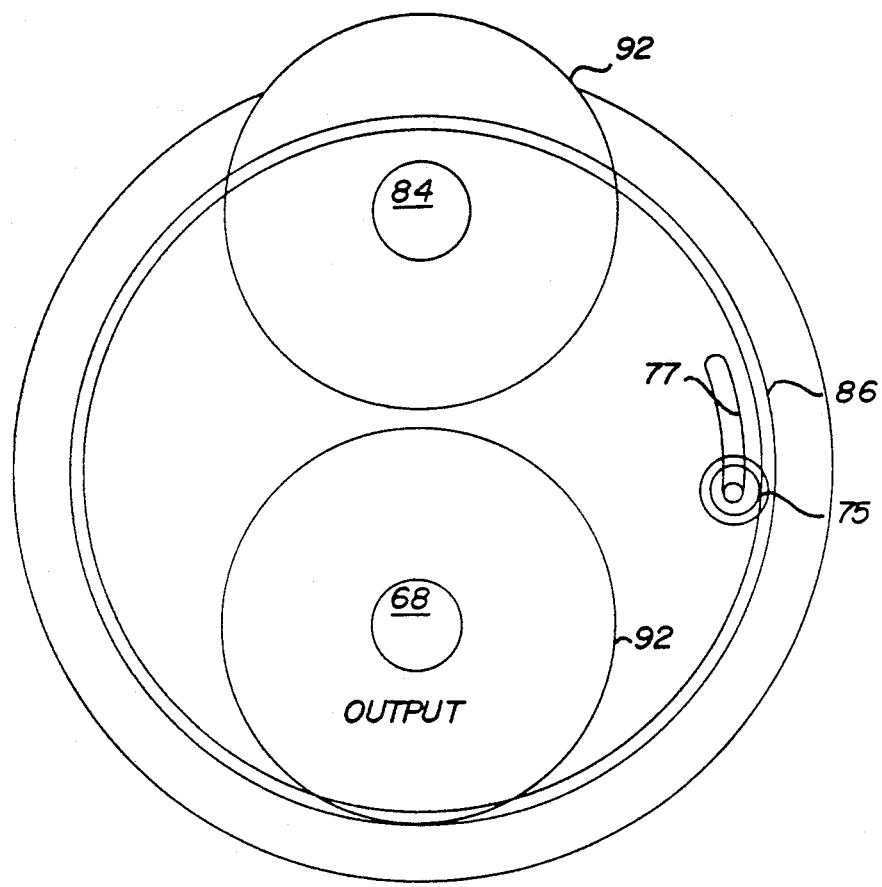
FIG. 24 is side elevational view illustrating an alternative embodiment for an actuator for the power ring.

The position of the ring actuator 98 is in the preferred embodiment controlled by a computer but may be controlled mechanically to position power ring 86 in race 88 to maintain the maximum torque provided by the internal combustion engine through input shaft 60 at the lowest speed from the internal combustion engine required to maintain a given output through shaft 82. The power ring actuator 98 positions power ring 86 in race 88 to divide rotational power between the input sheave 68 and the output sheave 84 to achieve or maintain the desired rotational speed of output shaft 82. The power ring actuator 98 may be a rod and race arrangement as illustrated in FIG. 6 or include a roller 75 in conjunction with slot 77 FIG. 24 for radially positioning power ring in race 88 of input sheave 68 and output sheave 84 or other actuator means for radially positioning power ring in sheaves 68 and 84. Power ring 86 when in the position as illustrated in FIG. 6 provides the maximum power input to output shaft 82 through input sheave 68 since output sheave 84 is rotating at maximum speed. Moving the actuator 98 in the direction of arrow 116 (FIG. 6) moves power ring 86 into race 88 in the direction of arrow 118 to increase the speed of input sheave 84, and thereby increasing the amount of power distributed to shaft 108 and change the speed of ring gear 114 and output shaft 82. Continuing to move the cylindrical power ring 86 in the direction 116 can depending upon the relative sizes of the sheaves result in a greater power transfer to output sheave 84 and result in the output shaft 82 reversing its direction as in the case where a reverse setting is selected for the vehicle.

Figures 9, 10:
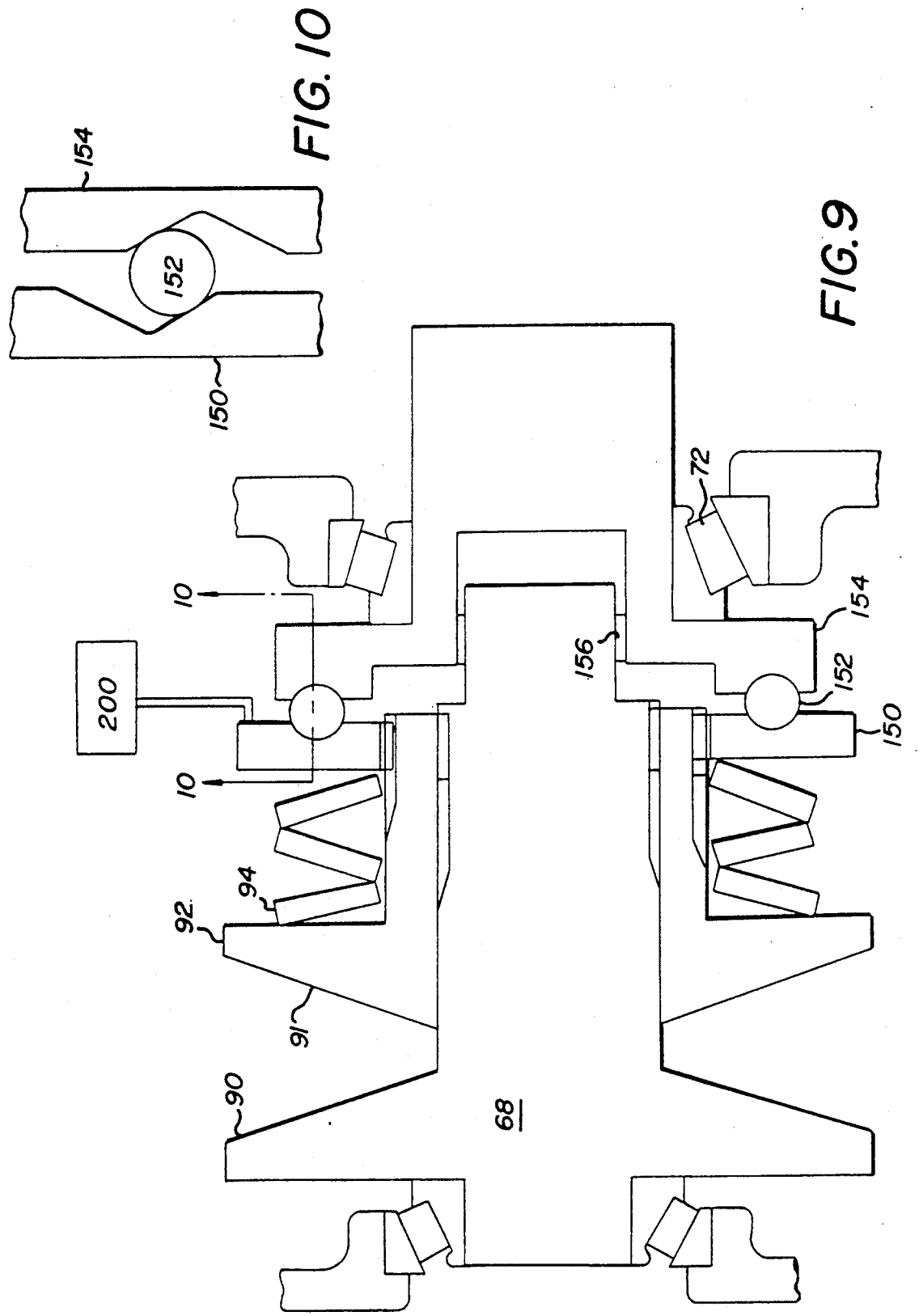
FIG. 9 is an alternative embodiment of a sheave including a ball and ramp torque device for accommodating torque overload in accordance with a preferred embodiment of the invention.
FIG. 10 is an enlarged sectional view taken along the lines 10—10 of the ball and ramp torque device in FIG. 9.

In the preferred embodiment of the invention a ball and ramp clutch arrangement is used in clutch housing 56. A modification of the ball and ramp arrangement is also utilized in accordance with the preferred embodiment of the invention to provide a ball and ramp torque device for input sheave 68 and output sheave 84 to prevent damage to the transmission on temporary overload conditions. Referring now to FIG. 9 a ball and ramp torque device is provided for both the input sheave 68 and output sheave 84 which for purposes of illustration in FIG. 9 shows an input sheave 68 with Bellville spring 94 with a ball and ramp plate 150 with a ball 152 disposed between the ball and ramp plate 150 and the ball and ramp shaft assembly 154 which is maintained in position by bushing 156. The purpose of the ball and ramp torque device as illustrated in FIGS. 9 and 10 is to increase the total transmission efficiency and durability because the ball and ramp torque device added to sheaves 68 and 84 can provide an axial force that is proportional to the torque transmitted by each sheave.

Without the utilization of the ball and ramp torque device on the sheaves the axial forces provided by Bellville springs 94 must be at all times at maximum force levels. Such high forces are not required continuously, but only a fraction of time. The continuous presence of peak force level result in a high wear rate and a higher loss of energy. The utilization of the ball and ramp torque device on input sheave 68 and output sheave 84 reduces the level of the forces that operate on power ring 86 between the walls 90 and 91 and substantially flat sides 100 and 102 of power ring 86 to the lowest level required to provide proper operation, thus increasing the wear life and efficiency.

The purpose of the ball and ramp type slip clutch as illustrated in FIG. 6 enclosed in clutch housing 56 is to provide an accurate predetermined available slip torque to protect the power ring from slipping over the sheaves under transmission overload conditions. Such a slippage of the power ring over the sheaves could cause damage that would make the transmission inoperable. A standard clutch assembly does not have the torque limit advantages of the ball and ramp clutch assembly and as a result standard clutch might not provide adequate protection to avoid the power ring and sheaves from breaking away or slipping under overload conditions. Similarly the ball and ramp torque device applied to input sheave 68 and output sheave 84 provides improved overload protection for output sheave 84 and ring gear drive shaft 108 between gear 112 and sheave 84.

In the preferred embodiment of the invention the moveable hub 92 of input sheave 68 is disposed in on axial direction and the moveable hub of output sheave 84 is disposed in the opposite axial direction to maintain power ring 86 in a substantially perpendicular relationship to sheaves 68 and 84 as power ring 86 moves radially with respect to race 88. This arrangement assists in maintaining the substantially flat contact between walls 90 and 91 of the sheaves and the substantially flat sides 100 and 102 of power ring 86.

The substantially flat sides 100 and 102 of power ring 86 provide a power ring having a substantially frustro conical cross sectional configuration at the area of contact between power ring 86 and sheaves 68 and 84. The substantially flat side faces 100 and 102 (FIG. 12) may include one or more grooves 111 (FIG. 13) to assist in the lubrication between walls 90 and 91 of sheaves 68 and 84 and power ring 86. Grooves 111 may be disposed concentric to power ring 86 as illustrated in FIGS. 13 and 14 or eccentric to power ring 86 FIG. 15, radially to power ring 86 as illustrated in FIG. 16 or a combination thereof.

Figure 22:
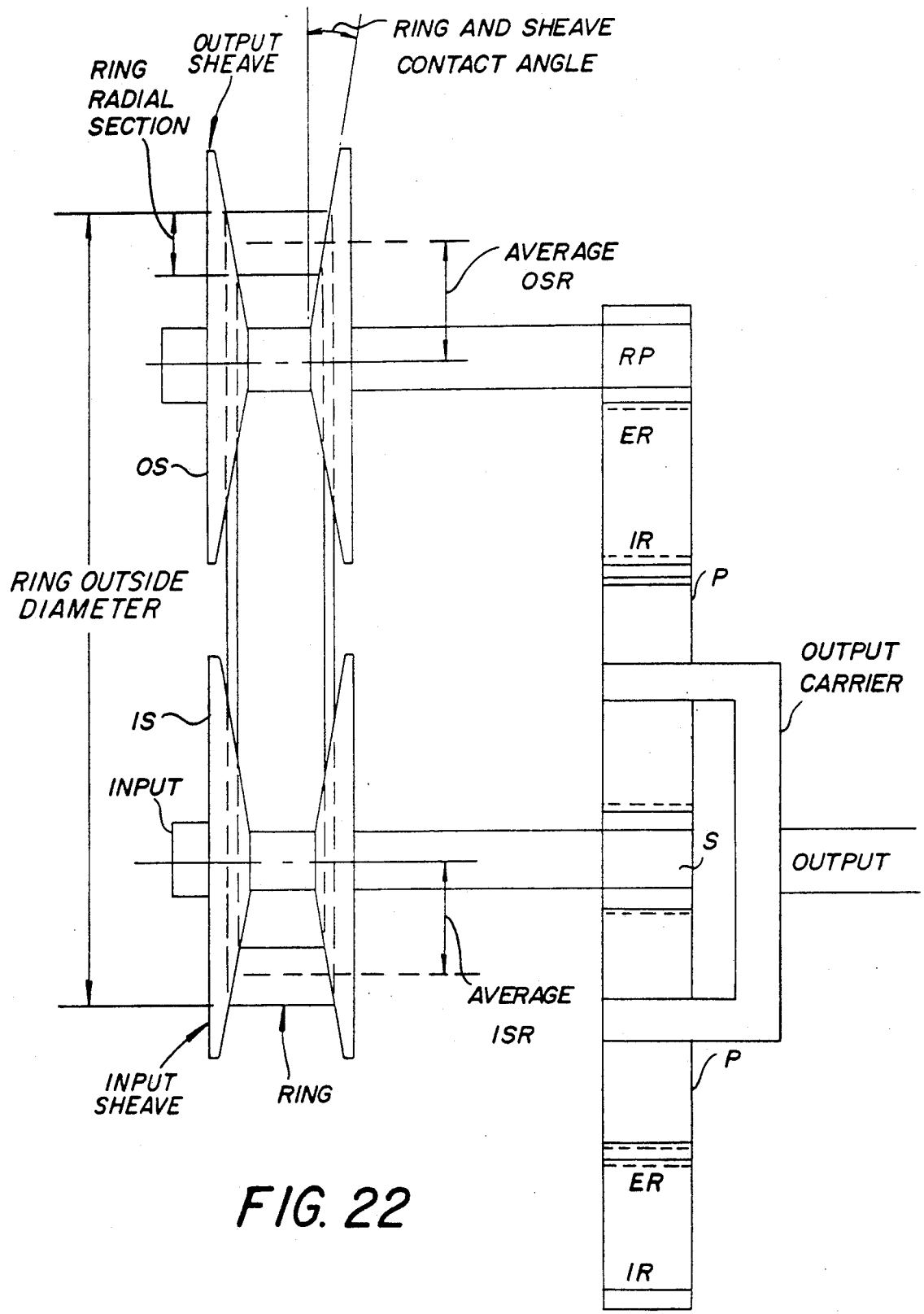
FIG. 22 is a schematic diagram of the relationship between the input sheave, output sheave and the power ring.
Figure 23:
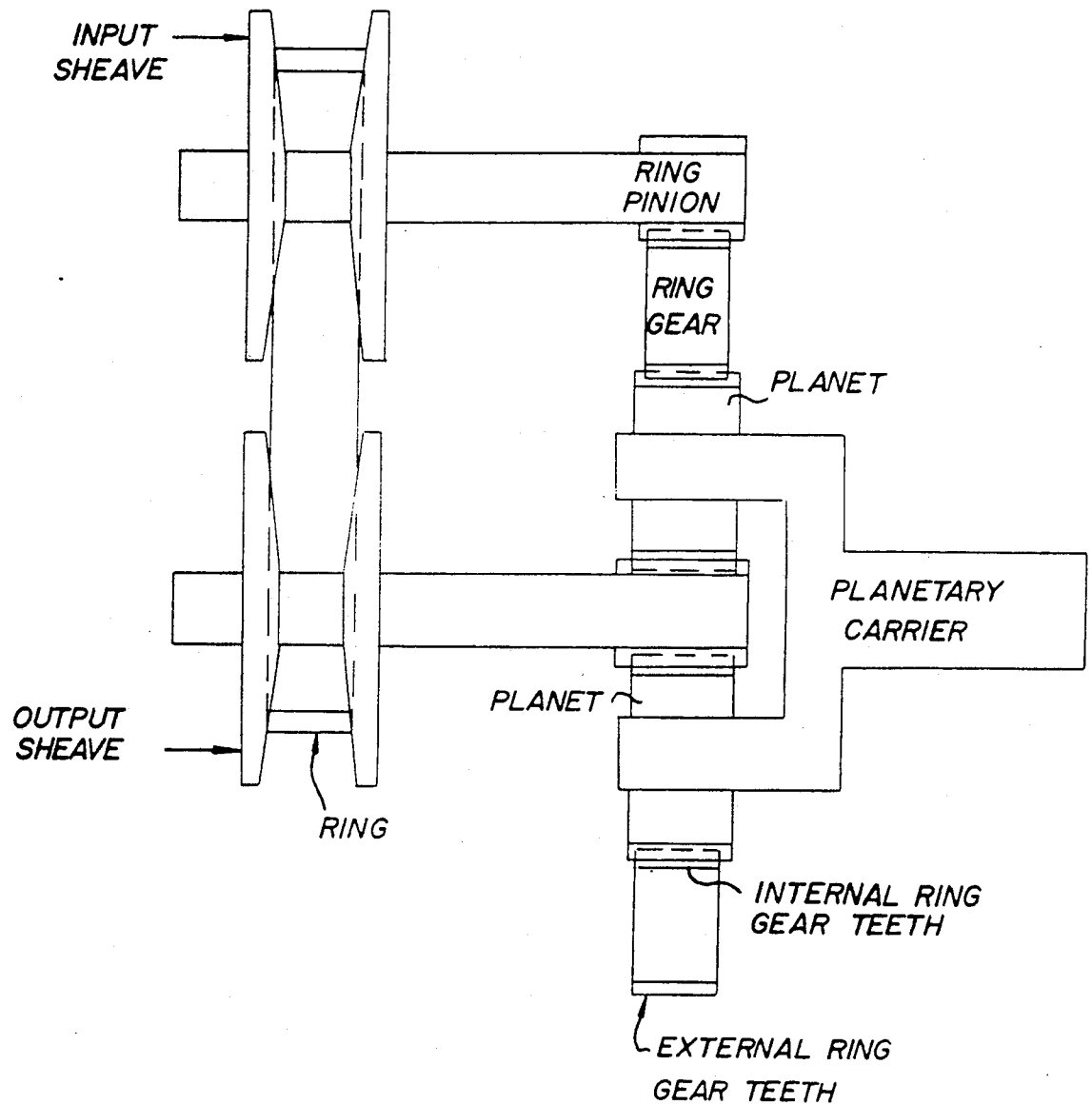
FIG. 23 is a schematic diagram of the relationship of the input sheave, output sheave, power ring and planetary device.

The relationship between the input sheave 68 and output sheave 84 in relation to the power ring 86 and the planetary device is illustrated in FIG. 22. The relationship between the included angles on the input and output sheaves and the power ring in relation to the axial movement of the sheaves and radial repositioning of the power ring is illustrated in FIG. 22. The equation for the speed relationship between the sheaves in relation to power ring 86 is given by the following equations:

FIG. 22 AND DEFINITION OF TERMS

RAF = Ring Axial Force
RNF = Ring Normal Force
RAF = RNF COS (FA)
RRS = Ring Radial Section
ISR = Input Sheave Radius to Ring Contact (At Center Of RRS)
OSR = Output Sheave Radius To Ring Contact
Sheave Coeff. = Traction Coefficient = $\mu$ (The Coefficient of Friction)

$$\text{RING } RPM = \frac{IS_{RPM} \times 2\, ISR}{\text{Ring } OD - RRS}$$

Ring Linear Velocity In FPM (Where Other Dimensions Are in Inches)

$$\text{Ring Linear Velocity} = \text{Ring } RPM \frac{\pi\, (\text{Ring } OD - RRS)}{12}$$

$$OS_{Torque} = 2\,\mu \times RNF \times OSR$$

$$RNF = \frac{OS_{Torque}}{2\mu\, OSR}$$

$$RAF = \frac{(OS_{Torque})\cos(FA)}{2\mu\, OSR}$$

RRF = RING RADIAL FORCE
RRF = RNF × SIN(FA)

The surface compressive forces between the sheaves and the power ring of the present invention are based upon a convex sheave and a concave ring using maximum effective contact radii. The relationship illustrated in FIG. 22 between the sheave and the ring base surfaces allows low stress and high horsepower transmission between the sheaves through the power ring and are given by the following equations:

SURFACE COMPRESSIVE STRESS

Sheave and power ring design. Calculations are based on a convex sheave and concave ring using effective contact radii.

| | |
|---|---|
| IS — Input Sheave | CRIS — Effective Radius IS |
| R — Ring | CRR — Effective Radius R |
| ISR — IS Radius to Center of Ring Contact | CL — Contact Length Between IS and R |
| RR — Ring Radius to Center of RRS | FA — Sheave Face Angle |
| ROD — Outside Diameter of Ring | SFC — Static Friction Coefficient |
| RRS — Ring Radial Section Thickness | HP — Horsepower |
| RNF — Ring Normal Force | SCS — Surface Compressive Stress |

$$RNF = \frac{IS\ Torque}{SFC \times (2 \times IRS)}$$

$$CL = \frac{RRS}{\cos FA}$$

$$CRIS = \frac{ISR}{\sin FA}$$

$$RR = \frac{ROD - RRS}{2}$$

$$CRR = \frac{RR}{\sin FA}$$

$$KD = \frac{(2 \times CRIS) \times (2 \times CRR)}{(2 \times CRR) - (2 \times CRIS)}$$

The relationship between the sheaves, power ring and planetary device as illustrated schematically in FIG. 22 for the infinitely variable transmission is expressed by the following equations:

INFINITELY VARIABLE TRANSMISSION (INPUT INTO SUN)

C ~ Carrier (Output)
S ~ Sun Gear
IR ~ Internal Ring Gear
ER ~ External Ring Gear
RP ~ Ring Pinion
P ~ Planet Gear
IS ~ Input Sheave
OS ~ Output Sheave

-continued
INFINITELY VARIABLE TRANSMISSION (INPUT INTO SUN)

$$SR \sim \text{Sheave Ratio} = \left(\frac{OS\ \text{Radius}}{IS\ \text{Radius}}\right)$$

*Note:
SR is variable, but calculations are based on a given SR.

RPM CALCULATIONS $S_{RPM}$ = Input RPM
$IS_{RPM} = S_{RPM}$
$OS_{RPM} = IS_{RPM}/SR$
$RP_{RPM} = OS_{RPM}$ $$ER_{RPM} = -RP_{RPM} \times \frac{RP\ \text{Teeth}}{ER\ \text{Teeth}}$$

$IR_{RPM} = ER_{RPM}$ $$P_{RPM} = \left(-S_{RPM} \times \frac{S\ \text{Teeth}}{S\ \text{Teeth} + IR\ \text{Teeth}} \times \frac{IR\ \text{Teeth}}{P\ \text{Teeth}}\right) +$$

$$\left(IR_{RPM} \times \frac{IR\ \text{Teeth}}{S\ \text{Teeth} + IR\ \text{Teeth}} \times \frac{S\ \text{Teeth}}{P\ \text{Teeth}}\right)$$

(This gives $P_{RPM}$ on its mounting shaft)

$$C_{RPM} = \left(S_{RPM} \times \frac{S\ \text{Teeth}}{S\ \text{Teeth} + IR\ \text{Teeth}}\right) +$$

$$\left(IR_{RPM} \times \frac{IR\ \text{Teeth}}{S\ \text{Teeth} + IR\ \text{Teeth}}\right)$$

(Note the sign of $S_{RPM}$ & $IR_{RPM}$ are always opposite each other)

IS ~ Input Sheave
OS ~ Output Sheave
S ~ Sun Gear
P ~ Planet Gear
IR ~ Internal Ring Gear
ER ~ External Ring Gear
RP ~ Ring Pinion
C ~ Carrier
SR ~ Sheave Ratio Output Torque Limit Factor ~ Specified
Maximum Input Torque ~ Specified If $\left| \text{Maximum Input Torque} \times \frac{\text{Input RPM}}{\text{Carrier RPM}} \right| \leq$ Maximum Input Torque × OT Limit Factor ×

$$\frac{S\ \text{Teeth} + IR\ \text{Teeth}}{S\ \text{Teeth}}$$

Then Input Torque Used = Maximum Input Torque otherwise,

Input Torque Used = Maximum Input Torque ×

Output Torque Limit Factor ×

$$\frac{S\ \text{Teeth} + IR\ \text{Teeth}}{S\ \text{Teeth}} \times \frac{C\ RPM}{\text{Input}\ RPM}$$

$$C_T = -\text{Input Torque Used} \times \frac{\text{Input}\ RPM}{C\ RPM}$$

$$IS_T = (-C_T - \text{Input Torque Used})/\left(\frac{ER\ \text{Teeth}}{RP\ \text{Teeth}} \times SR + 1\right)$$

-continued
RPM CALCULATIONS $$OS_T = -IS_T \times SR$$
$$RP_T = -OS_T$$
$$ER_T = RP_T + \frac{ER \text{ Teeth}}{RP \text{ Teeth}}$$
$$IR_T = -ER_T$$

$$P_T = -S_T \times \frac{P \text{ Teeth}}{S \text{ Teeth}} / 3 \text{ (3 Planets Mesh with Sun)}$$

The foregoing equations when calculated out for a 250 horsepower motor with an output torque limit factor of 1 is shown in Table 1 or with the output torque limit factor of 3 is provided in Table 2.

TABLE 1

| TEETH | NDP | NPA | WPA | FW | HA | OD | NPD | WPD | CD | PART |
|---|---|---|---|---|---|---|---|---|---|---|
| S 11 | 4 | 30.00 | 32.00 | 2.50 | 0.00 | 3.308 | 2.750 | 2.808 | 3.447 | — |
| P 16 | 4 | 30.00 | 32.00 | 2.00 | 0.00 | 4.585 | 4.000 | 4.085 | 0.000 | G-B-10 |
| IR43 | 4 | 30.00 | 32.00 | 1.50 | 0.00 | 11.478 | 10.750 | 10.978 | 0.000 | — |
| ER68 | 4 | 30.00 | 33.00 | 2.00 | 0.00 | 18.054 | 17.000 | 17.554 | 10.197 | — |
| RP11 | 4 | 30.00 | 33.00 | 2.50 | 0.00 | 3.340 | 2.750 | 2.840 | 0.000 | — |

| SHEAVE | | SHEAVE RADIUS | | RING | |
|---|---|---|---|---|---|
| MAXIMUM DIA | 10.000 | MIN | 2.900 | RADIAL SECTION | 0.3000 |
| MINIMUM DIA | 5.500 | AVE | 3.875 | OUTSIDE DIA | 18.25 |
| FACE ANGLE | 3.000 | MAX | 4.850 | MAX INPUT HP | 249.93 |
| STATIC FRICTION COEF. | 0.050 | C = 0 | 3.002 | INPUT TORQUE | 6563 DIESEL |
| CLEARANCE | 0.120 | HP LIM | 7.749 | OUT TORQUE LIMIT FACTOR | 1.00 |

| INPUT RPM | SHEAVE RATIO | TOTAL RATIO | OUTPUT RPM | TOTAL % EFF. | INPUT HP | HP LOSS @ IS | HP LOSS @ OS | HP LOSS TOT. | OUTPUT HP |
|---|---|---|---|---|---|---|---|---|---|
| 2400 | 0.60 | 85.29 | −28 | 65.5% | 21.53 | 1.93 | 4.71 | 6.64 | 14.39 |
|  | 1.00 | 13.35 | 180 | 94.4% | 95.41 | 1.77 | 1.75 | 3.51 | 91.89 |
|  | 1.67 | 7.89 | 304 | 96.5% | 157.81 | 1.69 | 0.67 | 2.36 | 155.44 |
|  | 0.63 | INFINITE | 0 | 0.0% | 6.07 | 1.89 | 4.18 | 6.07 | 0.00 |
|  | 6324.16 | 4.91 | 489 | 98.0% | 249.90 | 0.03 | 0.00 | 0.03 | 249.95 |

| | INR-OVAL RINGPLV MAXSLIDE VEL | | | | | AXIAL | RADIAL | NORMAL | AXIAL | RADIAL | NORMAL |
|---|---|---|---|---|---|---|---|---|---|---|---|
| RPM | GROWTH | (FT/MIN) | RPM | IS | OS | % | FORCES: IS | | | OS | |
| 2400 | 0 | 6095 | 1297 | 87 | 213 | 2.8% | 14657 | 768 | 14677 | 14553 | 763 | 14573 |
|  | 0 | 4869 | 1036 | 107 | 107 | 4.3% | 10868 | 570 | 10883 | 10748 | 563 | 10763 |
|  | 0 | 3644 | 776 | 128 | 52 | 6.8% | 8722 | 457 | 8734 | 8569 | 449 | 8581 |
|  | 0 | 5966 | 1270 | 89 | 198 | 2.9% | 14004 | 734 | 14024 | 13900 | 728 | 13919 |
|  | 0 | 2 | 0 | 188 | 0 | 99.9% | 89 | 5 | 89 | 5357 | 281 | 5364 |

| | RPM (MAX INPUT TORQUE AVAILABLE = 6563.0 MAX IN HP = 249.93) | | | | | | | | | |
|---|---|---|---|---|---|---|---|---|---|---|
| GEAR | MIN | 1:1 | MAX | C = 0 | HP'LIM | MIN | 1:1 | MAX | C = 0 | HP'LIM |
| INPUT TORQUE |  |  |  |  |  | 565 | 2505 | 4144 | 159 | 6562 |
| S-TOTAL | 2400 | 2400 | 2400 | 2400 | 2400 | 6553 | −6722 | −6677 | −6817 | −6563 |
| SUN TOOTH |  |  |  |  |  | 2184 | −2241 | −2226 | −2272 | −2188 |
| P | −1669 | −1526 | −1441 | −1650 | −1314 | −3177 | 3259 | 3237 | 3305 | 3182 |
| IR | −649 | −388 | −232 | −614 | −0 | 25668 | −25499 | −25545 | −25404 | −25662 |
| ER | −649 | −388 | −232 | −614 | −0 | −25668 | 25499 | 25545 | 25404 | 25662 |
| RP | 4014 | 2400 | 1435 | 3795 | 0 | −4152 | 4125 | 4132 | 4109 | 4151 |
| C | −28 | 180 | 304 | 0 | 489 | 32222 | −32222 | −32222 | −32222 | −32225 |
| OS | 4014 | 2400 | 1435 | 3795 | 0 | 4152 | −4125 | −4132 | −4109 | −4151 |
| IS | 2400 | 2400 | 2400 | 2400 | 2400 | −7119 | 4217 | 2533 | 6658 | −0 |

| MESH | PITCH LINE VELOCITIES (FT/MIN) | | | | | SURFACE COMP. STRESS | | | | |
|---|---|---|---|---|---|---|---|---|---|---|
| S-P | 1765 | 1765 | 1765 | 1765 | 1765 | 116386 | 117880 | 117478 | 118710 | 116473 |
| P-IR | 1765 | 1632 | 1541 | 1765 | 1405 | 68007 | 68614 | 68214 | 69330 | 67373 |
| RP-ER | 1866 | 1116 | 667 | 1765 | 0 | 133908 | 130234 | 127674 | 132837 | 117450 |
| OS-R | 6095 | 4869 | 3644 | 5966 | 2 | 55717 | 37953 | 27241 | 53066 | 9287 |
| IS-R | 6095 | 4869 | 3644 | 5966 | 2 | 35627 | 38164 | 43134 | 35632 | 257624 |

| | CONTACT RADIUS | | | CONTACT WIDTH | | | RADIAL COMPRESSION | | |
|---|---|---|---|---|---|---|---|---|---|
| | MIN | 1:1 | MAX | MIN | 1:1 | MAX | MIN | 1:1 | MAX |
| OUT'SHEAVE | 55.4 | 74.0 | 92.7 | 1.110 | 1.206 | 1.344 | 0.00278 | 0.00246 | 0.00244 |
| IN' SHEAVE | 92.7 | 74.0 | 55.4 | 1.743 | 1.206 | 0.856 | 0.00410 | 0.00246 | 0.00165 |
| RING | 171.5 | 171.5 | 171.5 |  |  |  | 0.00221 | 0.00106 | 0.00132 |

$S_T = C_T - IR_T$ (Use Absolute Values)

The foregoing equations when calculated out for a 250 horsepower motor with an output torque limit factor of 3 is provided in Table 2.

TABLE 2

| TEETH | NDP | NPA | WPA | FW | HA | OD | NPD | WPD | CD | PART |
|---|---|---|---|---|---|---|---|---|---|---|
| S 11 | 4 | 30.00 | 32.00 | 2.50 | 0.00 | 3.308 | 2.750 | 2.808 | 3.447 | — |
| P 16 | 4 | 30.00 | 32.00 | 2.00 | 0.00 | 4.585 | 4.000 | 4.085 | 0.000 | G-B-10 |
| IR43 | 4 | 30.00 | 32.00 | 1.50 | 0.00 | 11.478 | 10.750 | 10.978 | 0.000 | — |

TABLE 2-continued

| | | | | | | | | | |
|---|---|---|---|---|---|---|---|---|---|
| ER68 | 4 | 30.00 | 33.00 | 2.00 | 0.00 | 18.054 | 17.000 | 17.554 | 10.197 | — |
| RP11 | 4 | 30.00 | 33.00 | 2.50 | 0.00 | 3.340 | 2.750 | 2.840 | 0.000 | — |

| SHEAVE | | SHEAVE RADIUS | | RING | |
|---|---|---|---|---|---|
| MAXIMUM DIA | 10.000 | MIN | 2.900 | RADIAL SECTION | 0.3000 |
| MINIMUM DIA | 5.500 | AVE | 3.875 | OUTSIDE DIA | 18.25 |
| FACE ANGLE | 3.000 | MAX | 4.850 | MAX INPUT HP | 249.93 |
| STATIC FRICTION COEF. | 0.050 | C = 0 | 3.002 | INPUT TORQUE | 6563 DIESEL |
| CLEARANCE | 0.120 | HP LIM | 3.773 | OUT TORQUE LIMIT FACTOR | 3.00 |

| INPUT RPM | SHEAVE RATIO | TOTAL RATIO | OUTPUT RPM | TOTAL % EFF. | INPUT HP | HP LOSS @ IS | @ OS | TOT. | OUTPUT HP |
|---|---|---|---|---|---|---|---|---|---|
| 2400 | 0.60 | 85.29 | −28 | 65.5% | 64.58 | 5.78 | 14.13 | 19.91 | 43.15 |
| | 1.00 | 13.35 | 180 | 94.4% | 249.93 | 4.63 | 4.58 | 9.20 | 240.73 |
| | 1.67 | 7.89 | 304 | 96.5% | 249.93 | 2.67 | 1.07 | 3.74 | 246.19 |
| | 0.63 | INFINITE | 0 | 0.0% | 18.21 | 5.66 | 12.55 | 18.21 | 0.00 |
| | 0.95 | 14.73 | 163 | 93.8% | 249.93 | 5.10 | 5.54 | 10.65 | 239.28 |

| | INR-OVAL | RINGPLV (FT/MIN) | MAXSLIDE VEL | | | | AXIAL FORCES: IS | RADIAL | NORMAL | AXIAL | RADIAL OS | NORMAL |
|---|---|---|---|---|---|---|---|---|---|---|---|---|
| RPM | GROWTH | | RPM | IS | OS | % | | | | | | |
| 2400 | 0 | 6095 | 1297 | 87 | 213 | 2.8% | 43968 | 2304 | 44038 | 43655 | 2288 | 43715 |
| | 0 | 4869 | 1036 | 107 | 107 | 4.3% | 28470 | 1492 | 28509 | 28157 | 1476 | 28195 |
| | 0 | 3644 | 776 | 128 | 52 | 6.8% | 13814 | 724 | 13833 | 13572 | 711 | 13590 |
| | 0 | 5966 | 1270 | 89 | 198 | 2.9% | 42009 | 2202 | 42067 | 41697 | 2185 | 41754 |
| | 0 | 4998 | 1064 | 105 | 115 | 4.1% | 32050 | 1680 | 32094 | 31714 | 1662 | 31757 |

| | RPM (MAX INPUT TORQUE AVAILABLE = 6563.0 MAX IN HP = 249.93) | | | | | | | | |
|---|---|---|---|---|---|---|---|---|---|
| GEAR | MIN | 1:1 | MAX | C = 0 | HP'LIM | MIN | 1:1 | MAX | C = 0 | HP'LIM |
| INPUT TORQUE | | | | | | 1696 | 6563 | 6563 | 478 | 6563 |
| S-TOTAL | 2400 | 2400 | 2400 | 2400 | 2400 | 19658 | −17610 | −10574 | −20450 | −19328 |
| SUN\TOOTH | | | | | | 6553 | −5870 | −3525 | −6817 | −6443 |
| P | −1669 | −1526 | −1441 | −1650 | −1538 | −9531 | 8538 | 5127 | 9915 | 9371 |
| IR | −649 | −388 | −232 | −614 | −409 | 76997 | −66798 | −40457 | −76205 | −73210 |
| ER | −649 | −388 | −232 | −614 | −409 | −76997 | 66798 | 40457 | 76205 | 73210 |
| RP | 4014 | 2400 | 1435 | 3795 | 2530 | −12455 | 10805 | 6545 | 12327 | 11843 |
| C | −28 | 180 | 304 | 0 | 163 | 96655 | −84408 | −51032 | −96655 | −92538 |
| OS | 4014 | 2400 | 1435 | 3795 | 2530 | 12455 | −10805 | −6545 | −12327 | −11843 |
| IS | 2400 | 2400 | 2400 | 2400 | 2400 | −21354 | 11047 | 4011 | 19972 | 12765 |

| MESH | PITCH LINE VELOCITIES (FT/MIN) | | | | | SURFACE COMP. STRESS | | | | |
|---|---|---|---|---|---|---|---|---|---|---|
| S-P | 1765 | 1765 | 1765 | 1765 | 1765 | 201577 | 190790 | 147844 | 205601 | 199880 |
| P-IR | 1785 | 1632 | 1541 | 1765 | 1645 | 117786 | 111052 | 85846 | 120076 | 116380 |
| RP-ER | 1866 | 1116 | 667 | 1765 | 1176 | 231924 | 210786 | 160675 | 230068 | 221190 |
| OS-R | 6095 | 4869 | 3644 | 5966 | 4998 | 96501 | 61428 | 34283 | 91908 | 66731 |
| IS-R | 6095 | 4869 | 3644 | 5966 | 4998 | 61705 | 61769 | 54283 | 61713 | 64037 |

| | CONTACT RADIUS | | | CONTACT WIDTH | | | RADIAL COMPRESSION | | |
|---|---|---|---|---|---|---|---|---|---|
| | MIN | 1:1 | MAX | MIN | 1:1 | MAX | MIN | 1:1 | MAX |
| OUT'SHEAVE | 55.4 | 74.0 | 92.7 | 1.923 | 1.952 | 1.692 | 0.00834 | 0.00643 | 0.00386 |
| IN' SHEAVE | 92.7 | 74.0 | 55.4 | 3.018 | 1.952 | 1.078 | 0.01229 | 0.00643 | 0.00262 |
| RING | 171.5 | 171.5 | 171.5 | | | | 0.00664 | 0.00278 | 0.00209 |

Figure 17:
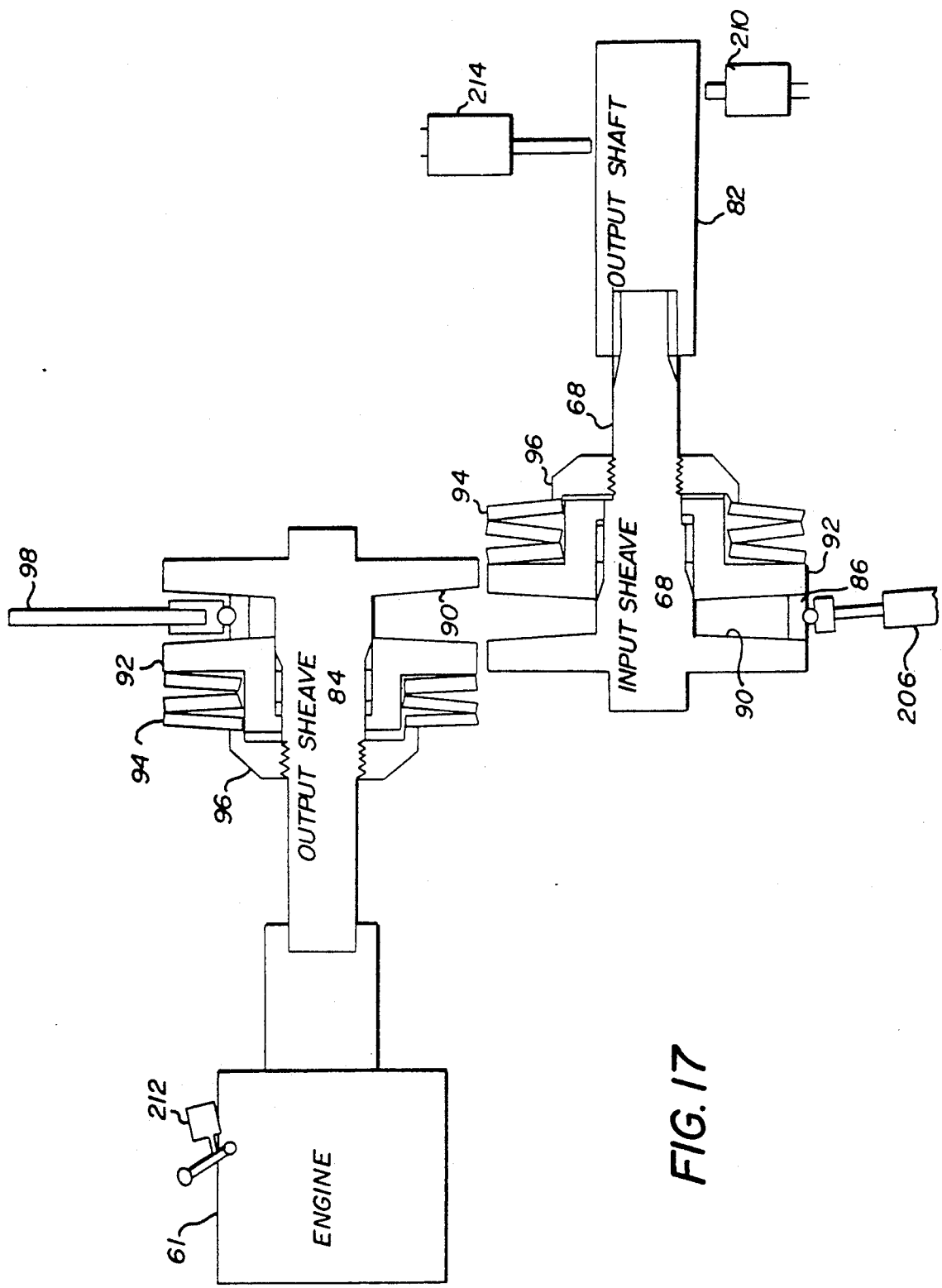
FIG. 17 is a mechanically variable speed transmission constructed in accordance with the invention having input and output sheaves and power ring with the input sheave operatively connected directly to the output shaft.

The present invention may be utilized in applications where the input power engine is connected to the output sheave (FIG. 17) or to the input sheave (FIG. 6) with or without optional clutches disposed between the input sheave 68 and the output sheave 84. In the broadest application of the invention the input sheave 68 and the output sheave 84 can be connected to the power ring 86 with only one of the sheaves being connected to the output shaft. In such applications such transmissions could include a clutch and a standard reverse gear if a reverse gear were desired. In FIG. 17 the position of the ring 86 determines the power supplied to output shaft 82 while providing the advantages of operating the internal combustion engine 61 at maximum torque and minimum speed necessary to obtain or maintain a desired output shaft torque or speed or a combination thereof.

Figure 18:
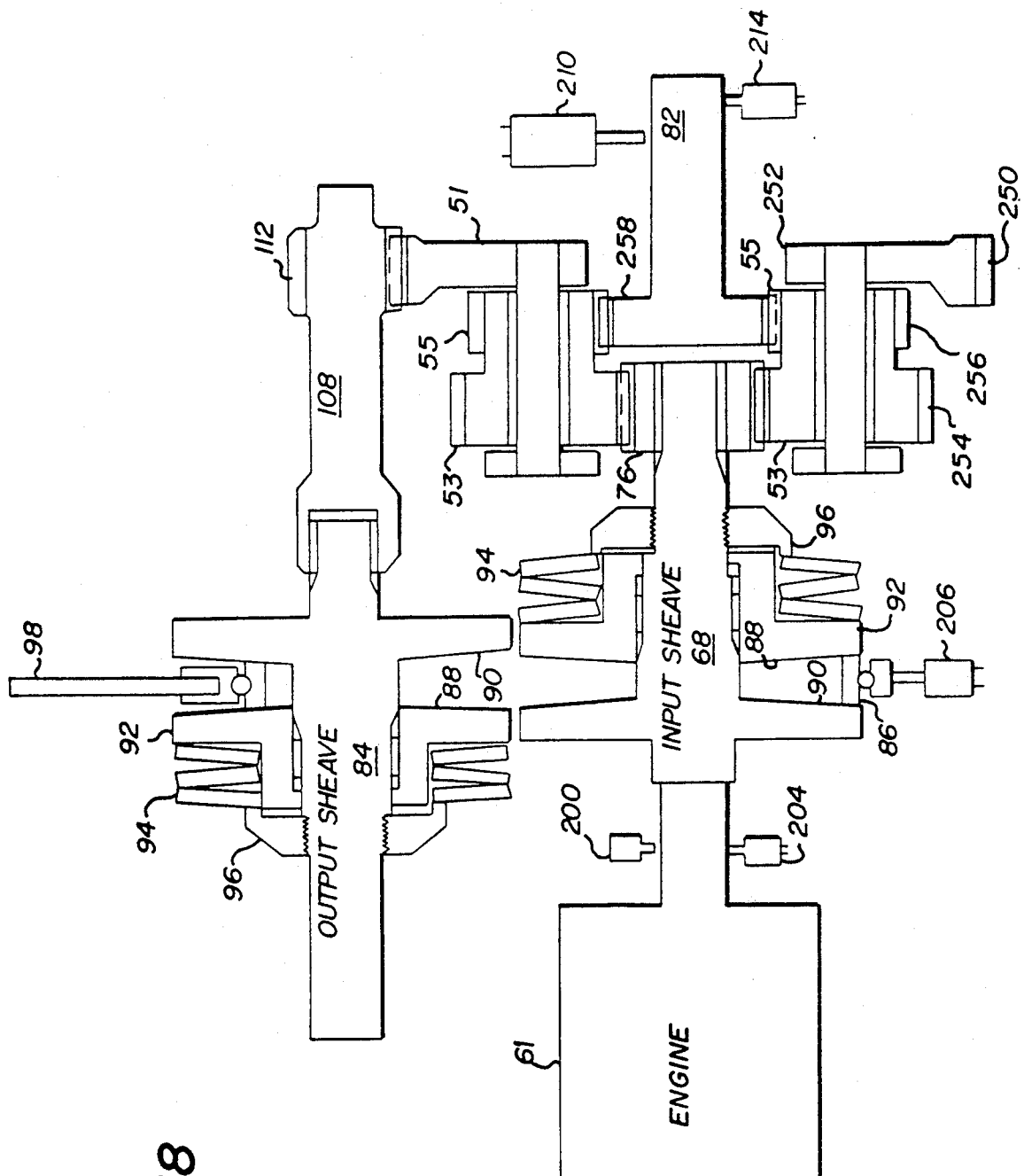
FIG. 18 is an infinitely variable mechanical transmission similar to FIG. 6 having input and output sheaves and power ring with a planetary device having the input sheave connected to a sun gear and the output sheave operatively connected to the planetary carrier and the output shaft operatively connected to the output sun gear.
Figure 19:
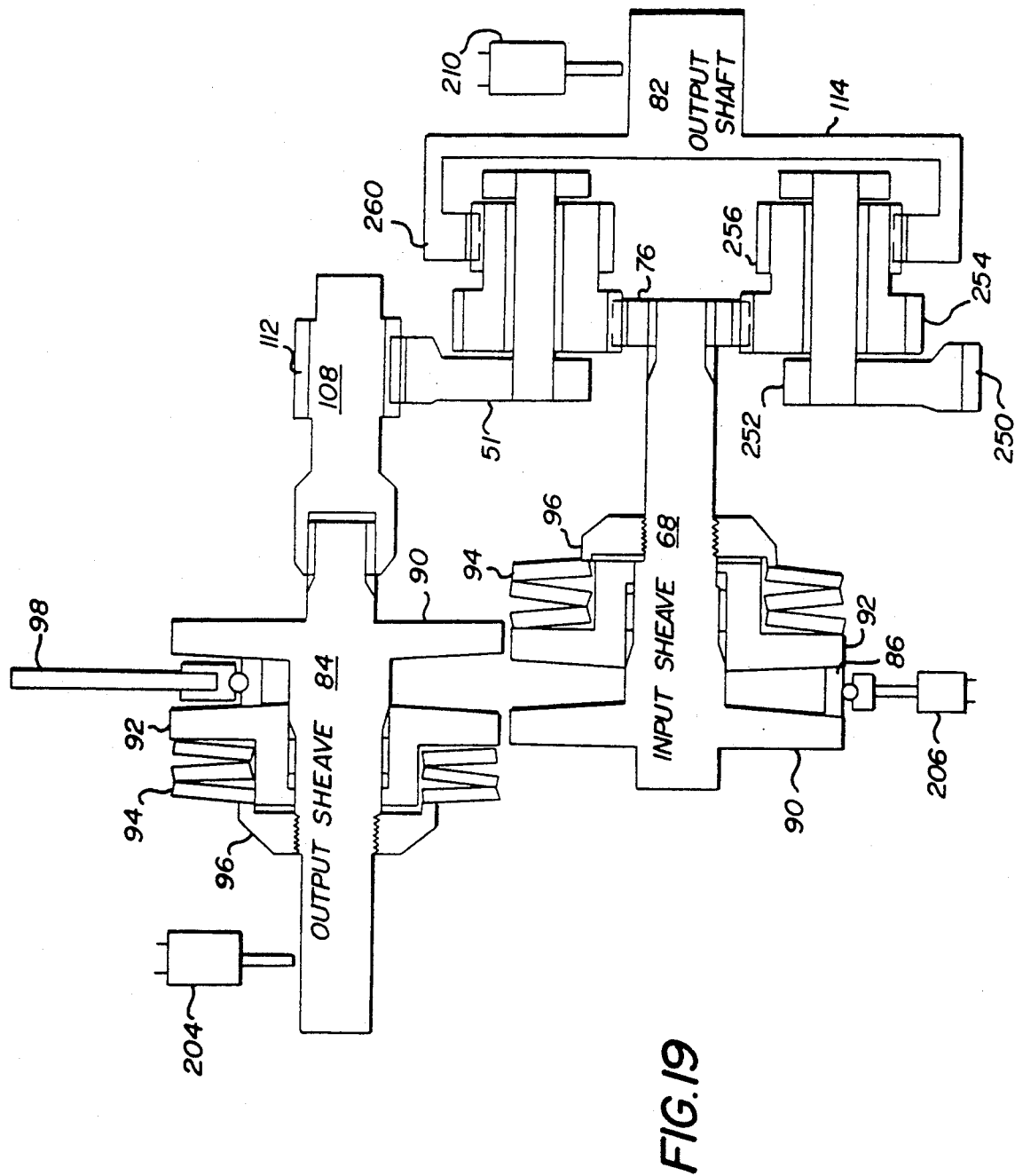
FIG. 19 is an infinitely variable mechanical transmission similar to FIG. 6 having input and output sheaves and power ring with a planetary device having the input sheave operatively connected to a sun gear and the output sheave operatively connected planetary carrier and the output shaft operatively connected to a ring gear.

Referring now to FIGS. 17, 18 and 19 a number of different arrangements are disclosed for connecting the input sheave 68 and output sheave 84 to the output shaft. As indicated in FIG. 17 one of the sheaves is connected directly to the output shaft while in FIGS. 6, 18 and 19 various forms of a planetary device are employed for operatively connecting the input and output sheaves to the output shaft 82. In FIG. 6 the input sheave 68 is connected to sun gear 76 and the output sheave 84 is operatively connected to ring gear 114. In FIG. 18 input sheave 68 and output sheave 84 are operatively connected to a planetary device in which input sheave 68 is operatively connected to sun gear 76, output sheave 84 is operatively connected to a planetary carrier 51 having compound gears 53 in which the output shaft 82 is operatively connected to gear teeth 55 of compound gears 53. In FIG. 19 the input sheave 68 is operatively connected to sun gear 76, output sheave 84 is operatively connected to the planetary carrier 51 and the output shaft is operatively connected to ring gear 114. These and arrangements for connecting either or both the input and output sheaves with the novel ring to an output shaft will be contemplated by those skilled in the art and these and other such embodiments are to be considered part of the invention.

The preferred embodiment of the invention contemplates the utilization of a computer or microprocessor to radially position power ring 86 with respect to race 88 in input sheave 68 and output sheave 84. The computer control of the actuator for positioning the power ring may adjust the position of the power ring 86 by utilizing inputs to the transmission alone (FIG. 20) or may utilize inputs to the transmission and control them in relation to the torque inputs, speed inputs or a combination of both and control the operation of the internal combustion engine at its maximum efficiency (FIG. 21).

Figure 20:
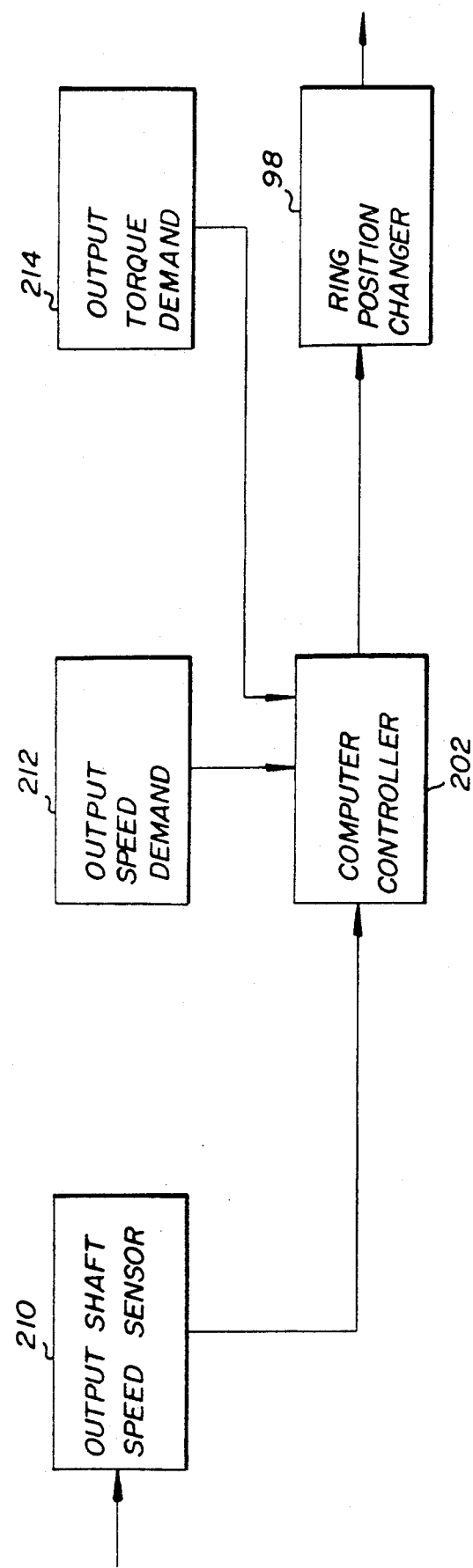
FIG. 20 is a schematic control block diagram showing computer control of the novel transmission of the invention.
Figure 21:
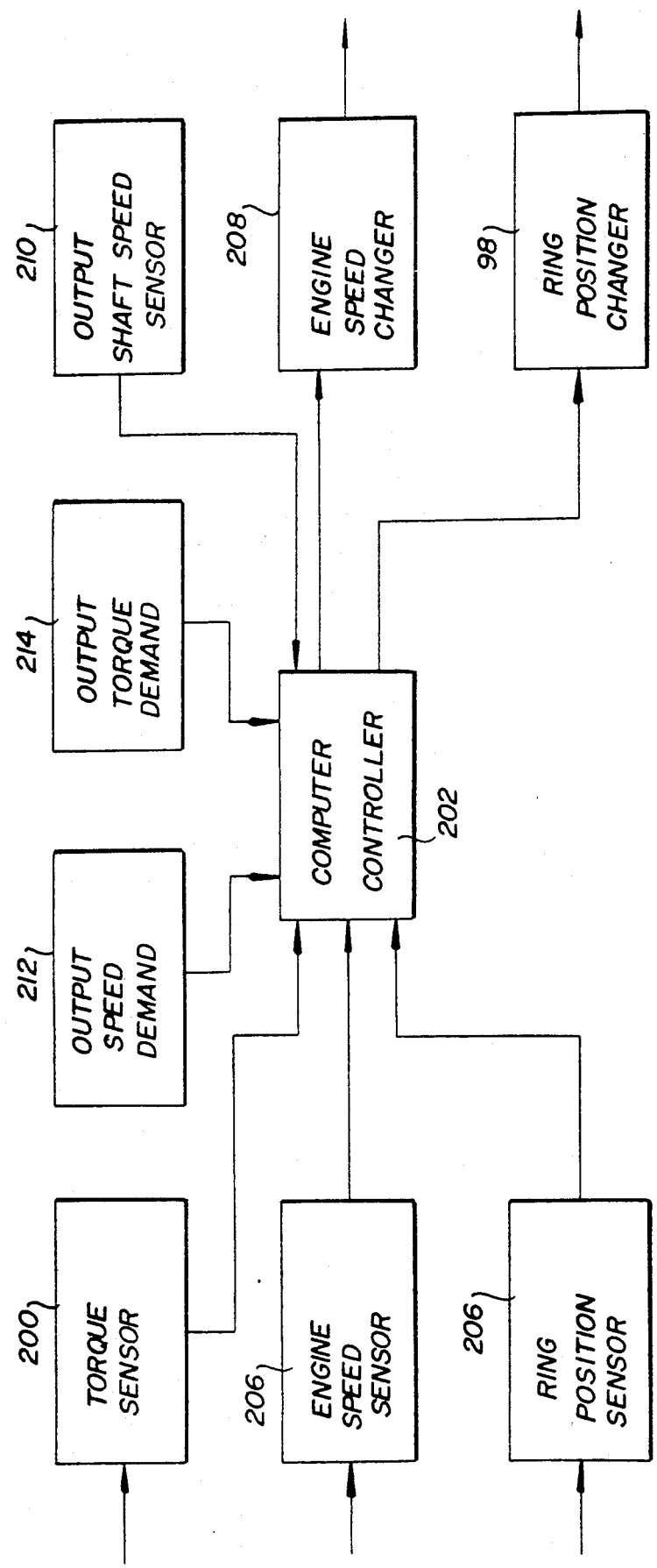
FIG. 21 is a schematic control block diagram showing computer control of an input power motor and the novel transmission of the invention.

In FIG. 20 a computer controller 202 is coupled to an output shaft sensor 210 (FIGS. 17 and 20) which coordinate changes in output speed demand 212 which monitors the change in throttle setting with an output torque demand 214 to activate ring position actuator 98 to radially reposition power ring 86 to smoothly increase or decrease the geared type drive relationship to output shaft 82 without the necessity of drastically increasing and decreasing engine speed as occurs in standard geared transmissions in engaging the clutch and shifting gears. In this manner wear and tear on the engine is reduced and pollution is also reduced in preventing the release of partially burned exhaust gasses.

The advantages of the present invention are further realized in interfacing the computer controller 202 with an internal combustion engine to monitor and control both the position of power ring 86 and the torque and speed or both of the internal combustion engine to operate the engine at its maximum efficiency. In this manner the internal combustion engine can be operated at the maximum torque and the minimum speed to provide a desired torque or speed or both at output shaft 82.

Referring now to FIGS. 18 and 20, taken in conjunction, represent a illustrative embodiment for connecting the sensors illustrated in FIG. 18 to a computer as illustrated in a simple flow chart (FIG. 20) to vary the infinitely variable mechanical transmission of the present invention is illustrated. In FIGS. 18 and 20 a torque sensor represented by block 200 a speed sensor 204 or both are connected to computer controller 202 to provide information to the computer controller regarding the operation of engine 61. An output torque demand sensor 214, output speed demand sensor 210 or both are disposed at the output shaft 82 to provide information to computer controller 202. With these inputs plus predetermined data on engine operation efficiency the computer controller can actuate ring position changer to position power ring 86 in the position that provides the maximum torque at the minimum speed to operate the engine at its maximum efficiency.

The output speed demand sensor 212 and an output torque demand sensor 214 transmit information to the computer 202 so that it can properly maintain the power ring radial sheave contact that determines the transmission ratio to operate the engine at its lowest possible ratio and at full load within the operating limits. Optionally the output speed demand sensor 212, and the output torque demand sensor 214 may be placed at the input to achieve the desired load and speed operation. Optionally, an output shaft speed sensor 210 may be connected to the computer 202 to transmit the speed of the output shaft 82 at all times. Computer controller 202 in the preferred embodiment modifies the position of the ring in relation to speed and load conditions in a manner to operate the engine at the highest or maximum torque while operating the engine at the lowest possible speed necessary to obtain or maintain a given output from the novel variable transmission.

The adjustable sheaves in combination with the metal substantially non deformable power ring provides precise control of the division of power between the input and output sheaves. The contact faces between the sheaves and the power ring can be made to have a small angle at the conical surface with a plane that is perpendicular to the centerline to provide precise control. This is because the conical geometry of the sheave flange can be made to approach a flat surface. As indicated by Table 1 even though the sheave outside radius is five inches and the power ring radius is 9.12 inches the invention allows a sheave virtual radius of 55.4 to 92.7 inches depending upon the radius of contact with the power ring. At the same time the power ring can have a virtual radius of 171.5 inches for a centerline distance of 10.197 inches between the sheaves. The above virtual radii are for sheave face angles of three degrees. The size of the virtual sheave radii increases as angle decreases and as the operating radii increase. This ability of the sheave and the power ring to have virtual radii that are substantially greater than the actual radii provide increased load carrying capacity that enables the transfer of greater amounts of power by employing smaller components.

The novel combination of sheave and power rings may be utilized alone or in combination with a variety of gears and planetary devices. In FIGS. 18 and 19 the ring pinion 108 is connected to gear 250 that is integrated with the planetary carrier 252. The two planet gears 254 and 256 in FIGS. 18 and 19 have different number of teeth but are joined together in one moving part. The output shaft 82 in FIG. 18 is connected to a sun gear 258, which is operated by planet gears 256. This planetary arrangement has the advantage that it may offer different speed ranges than the planetaries embodied in FIGS. 6 and 19. The planetary embodied in FIG. 19 has an output shaft 82 connected to output ring gear 260. This planetary arrangement may offer the advantage of yet different ratios than the planetaries embodied in FIGS. 6 and 18. Optionally the various types of planetaries may be used in conjunction with one another by means of clutches to combine the speed ranges and power capacities of more than one type of planetary.

The mechanically variable speed transmission can be optimized utilizing the computer as heretofore discussed with respect to FIGS. 20 and 21 or can be varied by a mechanical arrangement by the vehicle operator. In either embodiment the present mechanically infinitely variable speed transmission is superior to transmissions presently available in the prior art in providing greater fuel efficiency, reducing the amount of pollution by allowing the engine to operate at maximum torque and minimum speed and eliminates the rapid change from high speed to low speed when declutching is necessary to change gears in prior art transmissions.

The novel transmission of the invention can vary the output speed smoothly from maximum rotational speed in one direction to a maximum speed in the opposite direction while passing through or maintaining a zero output speed or any other speed in an forward or reverse direction. The changes in the output speed can be made continuously under full load as no clutching is necessary for varying the variable speed transmission.

In operation of the novel transmissions of the present invention the sheave operate at a speed determined by the position of the power ring. For example when the radius point of contact on the input sheave is twice as large as the contact point of the output sheave the speed of the output sheave will be twice as high as that of the input sheave. Conversely when the radius point of contact of the output sheave is twice as large as that of the input sheave the speed of the output sheave will be half as high as the speed of the input sheave. The power ring can operate at any radius on the sheave within the design limits.

In addition the relationship between the output power from the input sheave and the output power from the output sheave is dependant upon the number of teeth on the sun pinion and ring gear. For example if a planetary device is made to have a sun pinion with 20 teeth and a ring gear with three times as many teeth or 60 teeth then when the sun pinion rotates at 3000 RPM in one direction the planetary carrier will stand still when the ring gear operates at ⅓ that speed or 1,000 RPM in the opposite direction. In this manner a zero output speed can be obtained when the input operates at full speed. This advantage of the present invention will also result in a vehicle standing still even though the engine is operating at full speed and the clutch is engaged.

The present invention unlike the prior art provides advantages in the positive transmission of power between the input sheave and the output sheave by the utilization of a substantially circular power ring having side faces providing maximum contact to the side faces of the sheave as the power ring moves radially with respect to the sheave. The power ring is made of a substantially circular and substantially non deformable material to obviate the disadvantages of the prior art belts, chains and other devices which fold over or bunch up and as a result of operational stresses which can result in breakage. The application of a ball and ramp torque device to the sheaves further allows the sheaves to slip at an accurately predetermined slip torque to protect the sheaves from slipping over the ring when the transmission is overloaded at the clutch.

The present invention also has advantages over prior art transmissions in that it can operate at a higher horsepower, can take shock loads without noticeable damage and can operate in oils and lubricants that are not perfectly clean. As a result of its highly controllable arrangement of input and output sheaves it is better controllable than a hydrostatic transmissions and unlike hydrostatic transmissions is superior since it is a mechanical device and has a substantially higher efficiency and not subject to fluid contamination, fluid compressibility and fluid flow problems incumbent in hydraulic power devices.

The novel transmission also allows diesel and gasoline internal combustion engines to operate at less pollution than standard transmissions because the present infinitely variable transmission changes speed under load without interrupting the power transfer as required in synchronized power shift or geared transmissions. In standard transmissions incompletely burned exhaust fuels create atmospheric pollution as the engine is subjected rapidly from high loads to no load conditions. As a result the present transmission reduces wear, reduces pollution and increases engine life by maximizing the efficiency of the engine in relation to the power transmission.

The present invention is applicable to a wide range of applications and embodiments to vehicles, boats, airplanes and other applications of engines subjected to varying load requirements. The invention may be applied in a number of ways such as the utilization of a computer control for coordinating engine speed and transmission speed or in the relationship of the input sheave and output sheave to the planetary drives. The invention may also be utilized with more than one input sheave and more than one output sheave and more than one form of input power motor depending upon the particular application. In addition a clutch arrangement may in certain applications not be utilized or both sheaves may not be attached to the output shaft depending upon the particular design requirements and application. It is intended that these and other modifications be made in accordance with the spirit and scope of the following claims.

What is claimed is:

1. A mechanically variable transmission comprising:
   (a) a first adjustable sheave having a first race formed by said first adjustable sheave of a size in part defined by a moveable hub axially disposed in a first direction;
   (b) a second adjustable sheave having a second race formed by said second adjustable sheave of a size in part defined by a moveable hub axially disposed in a direction opposite to said moveable hub of said first adjustable sheave;
   (c) a substantially circular power ring having substantially flat side faces for connecting said first race of said first adjustable sheave to said second race of said second adjustable sheave;
   (d) means for radially positioning said substantially circular power ring in at least one race formed by said first adjustable sheave and said second adjustable sheave; and
   (e) an output shaft operatively connected to said first adjustable sheave.

2. The mechanically variable transmission of claim 1 wherein said first adjustable sheave and said second adjustable sheave have side faces at an included angle of from about 0.5° to 45°.

3. The mechanically variable transmission of claim 2 wherein said substantially circular power ring has a substantially frustro conical cross section configuration corresponding to said included angle of said first adjustable sheave and said second adjustable sheave.

4. The mechanically variable transmission of claim 3 wherein said side faces of said substantially circular power ring includes grooves.

5. The mechanical variable transmission of claim 4 wherein said grooves are radial, tangential or a combination thereof.

6. The mechanically variable transmission of claim 2 wherein said included angle is from about 3° to 15°.

7. The mechanically variable transmission of claim 6 wherein said first adjustable sheave is operatively connected to a member of a planetary device operatively connected to said output shaft.

8. The mechanically variable transmission of claim 7 wherein said second adjustable sheave is operatively connected to a planetary carrier operatively connected to said output shaft.

9. The mechanically variable transmission of claim 7 wherein said first adjustable sheave is operatively connected to a sun gear, said second adjustable sheave is connected to a planetary carrier and said output shaft is operatively connected to a set of planetary gears.

10. The mechanically variable transmission of claim 9 wherein said first adjustable sheave includes a ball and ramp torque device.

11. The mechanically variable transmission of claim 10 wherein said means for radially positioning said substantially circular ring is operatively connected to a race on said substantially circular ring for positioning said substantially circular ring.

12. The mechanically variable transmission of claim 11 further comprising a computer operatively connected to said actuator for positioning said substantially circular ring in response to output shaft speed.

13. The mechanically variable transmission of claim 12 further comprising an internal combustion engine operatively connected to said first adjustable sheave.

14. The mechanically variable transmission of claim 13 wherein said computer controls said internal combustion engine and said actuator.

15. The mechanically variable transmission of claim 14 wherein said computer operates said internal combustion engine at maximum torque and minimum speed and repositions said actuator to maintain a predetermined output shaft speed, output shaft torque or a combination thereof.

16. The mechanically variable transmission of claim 11 further comprising a computer operatively connected to said actuator for positioning said substantially circular ring in response to output shaft speed and output shaft torque.

17. The mechanically variable transmission of claim 11 further comprising a computer operatively connected to said actuator for positioning said substantially circular ring in response to output shaft torque.

18. The mechanically variable transmission of claim 10 wherein said second adjustable sheave includes a ball and ramp torque device.

19. The mechanically variable transmission of claim 7 wherein said first adjustable sheave is operatively connected to a sun gear said second adjustable sheave is operatively connected to a planetary carrier and said output shaft is operating connected to a ring gear.

20. The mechanically variable transmission of claim 19 wherein said first adjustable sheave includes a ball and ramp torque device.

21. The mechanically variable transmission of claim 20 wherein said second adjustable sheave includes a ball and ramp torque device.

22. The mechanically variable transmission of claim 19 wherein said means for radially positioning said substantially circular ring is an actuator operatively connected to said substantially circular ring for positioning said substantially circular ring.

23. The mechanically variable transmission of claim 22 further comprising a computer operatively connected to said actuator for positioning said substantially circular ring in response to output shaft torque.

24. The mechanically variable transmission of claim 22 further comprising a computer operatively connected to said actuator for positioning said substantially circular ring in response to output shaft speed.

25. The mechanically variable transmission of claim 24 further comprising an internal combustion engine operatively connected to said first adjustable sheave.

26. The mechanically variable transmission of claim 25 wherein said computer controls said internal combustion engine and said actuator.

27. The mechanically variable transmission of claim 26 wherein said computer operates said internal combustion engine at maximum torque and minimum speed and repositions said actuator to maintain a predetermined output shaft speed.

28. The mechanically variable transmission of claim 26 wherein said computer operates said internal combustion engine at maximum torque and minimum speed and repositions said actuator to maintain a predetermined output shaft torque.

29. The mechanically variable transmission of claim 7 wherein said first adjustable sheave is operatively connected to a sun gear, said second adjustabler sheave is operatively connected to a ring gear and said output shaft is operatively connected to a planetary carrier.

30. The mechanically variable transmission of claim 29 wherein said first adjustable sheave includes a ball and ramp torque device.

31. The mechanically variable transmission of claim 30 wherein said second adjustable sheave includes a ball and ramp torque device.

32. The mechanically variable transmission of claim 30 wherein said means for radially positioning said substantially circular ring is an actuator operatively connected to said substantially circular ring for positioning said substantially circular ring.

33. The mechanically variable transmission of claim 32 wherein said computer operates said internal combustion engine at maximum torque and minimum speed and repositions said actuator to maintain a predetermined output shaft torque.

34. The mechanically variable transmission of claim 32 further comprising a computer operatively connected to said actuator for positioning said substantially circular ring in response to output shaft torque.

35. The mechanically variable transmission of claim 32 further comprising a computer operatively connected to said actuator for positioning said substantially circular ring in response to output shaft speed and output shaft torque.

36. The mechanically variable transmission of claim 32 further comprising a computer operatively connected to said actuator for positioning said substantially circular ring in response to output shaft speed.

37. The mechanically variable transmission of claim 36 further comprising an internal combustion engine operatively connected to said second adjustable sheave.

38. The mechanically variable transmission of claim 36 wherein said computer controls said internal combustion engine and said actuator.

39. The mechanically variable transmission of claim 38 wherein said computer operates said internal combustion engine at maximum torque and minimum speed and repositions said actuator to maintain a predetermined output shaft speed.

40. A mechanically infinitely variable transmission comprising:
(a) a first adjustable sheave having side faces at an included angle of from about 0.5° to 45°;
(b) a second adjustable sheave having side faces at an included angle of from about 0.5° to 45°;
(c) a substantially circular power ring having side faces of a substantially flat side faces disposed at an angle corresponding to said included angle of said first adjustable sheave and said second adjustable sheave;
(d) an actuator for radially positioning said substantially circular power ring with respect to said first adjustable sheave and said second adjustable sheave; and
(e) a planetary device operatively connected to an output shaft and said first adjustable sheave and said second adjustable sheave.

41. The mechanically infinitely variable transmission of claim 40 wherein said first adjustable sheave and said second adjustable sheave include moveable hubs for adjusting the size of a race defined by said included angle and said moveable hubs of said first adjustable sheave and said second adjustable sheave.

42. The mechanically infinitely variable transmission of claim 41 wherein said moveable hubs for said first adjustable sheave and said second adjustable sheaves are axially aligned in opposite directions.

43. The mechanically infinitely variable transmission of claim 42 wherein said first adjustable sheave includes a ball and ramp torque device.

44. The mechanically infinitely variable transmission of claim 43 wherein said second adjustable sheave includes a ball and ramp torque device.

45. The mechanically infinitely variable transmission of claim 43 further comprising a computer for operating said actuator in response to output shaft speed demand.

46. The mechanically infinitely variable transmission of claim 43 further comprising a computer for operating said actuator in response to output shaft speed demand.

47. The mechanically infinitely variable transmission of claim 46 further comprising an input power motor wherein said input power motor and said computer includes means for controlling and operating said input power motor at or near maximum torque and lowest possible speed to maintain a desired output shaft speed, output shaft torque or a combination thereof by actuating said actuator.

48. A computer controlled mechanically variable transmission comprising:
    (a) a first adjustable sheave having a first race defined by side faces of said first adjustable sheave having an included angle of from about 0.5° to 45° and a moveable hub axially disposed in a first direction;
    (b) a second adjustable sheave having a second race defined by side faces of said second adjustable sheave having an included angle of from about 0.5° to 45° and a moveable hub axially disposed in a direction opposite to said moveable hub of said first adjustable sheave;
    (c) a substantially circular power ring having side faces for connecting said first race of said first adjustable sheave to said second race of said second adjustable sheave;
    (d) an actuator for radially positioning said substantially circular power ring with respect to said first adjustable sheave and said second adjustable sheave;
    (e) a planetary device operatively connected to an output shaft and said first adjustable sheave and said second adjustable sheave; and
    (f) a microprocessor operatively connected to said actuator for operating said actuator.

49. The computer controlled mechanically variable transmission of claim 48 wherein said first adjustable sheave includes a ball and ramp torque device.

50. The computer controlled mechanically variable transmission of claim 49 wherein said included angle of said first adjustable sheave and said second adjustable sheave is from about 3° to 15°.

51. The computer controlled mechanically variable transmission of claim 49 wherein said second adjustable sheave includes a ball and ramp torque device.

52. The computer controlled mechanically variable transmission of claim 49 further comprising an input power motor operatively connected to said microprocessor.

53. The computer controlled mechanically variable transmission of claim 52 further comprising a clutch mechanism.

54. The computer controlled mechanically variable transmission of claim 48 wherein said microprocessor operates said actuator in response to output speed demand.

55. The computer controlled mechanically variable transmission of claim 48 wherein said microprocessor operates said actuator in response to output torque demand.

* * * * *